United States Patent
Williamson et al.

(10) Patent No.: US 9,648,038 B2
(45) Date of Patent: *May 9, 2017

(54) PROPAGATION OF VIRUSES THROUGH AN INFORMATION TECHNOLOGY NETWORK

(71) Applicant: HEWLETT PACKARD ENTERPRISE DEVELOPMENT LP, Houston, TX (US)

(72) Inventors: Matthew Murray Williamson, Bristol (GB); John M. Brawn, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,080

(22) Filed: May 29, 2015

(65) Prior Publication Data

US 2016/0028747 A1 Jan. 28, 2016

Related U.S. Application Data

(62) Division of application No. 10/457,091, filed on Jun. 9, 2003, now Pat. No. 9,197,602.

(30) Foreign Application Priority Data

| Jun. 7, 2002 | (GB) | 0213053.2 |
| Oct. 19, 2002 | (GB) | 0224396.2 |
| Apr. 29, 2003 | (GB) | 0309844.9 |

(51) Int. Cl.
*G06F 15/173* (2006.01)
*H04L 29/06* (2006.01)

(52) U.S. Cl.
CPC ........ *H04L 63/145* (2013.01); *H04L 63/0227* (2013.01)

(58) Field of Classification Search
CPC .................. H04L 63/0227; H04L 63/145
USPC ....... 709/225, 206, 224, 232; 726/13, 27, 31
See application file for complete search history.

(56) References Cited

U.S. PATENT DOCUMENTS

| 5,341,491 A | 8/1994 | Ramanujan |
| 5,699,513 A | 12/1997 | Feigen et al. |
| 6,122,740 A | 9/2000 | Andersen |
| 6,339,784 B1 | 1/2002 | Morris et al. |
| 6,356,836 B1 | 3/2002 | Adolph |
| 6,370,125 B1 | 4/2002 | Belk |
| 6,775,657 B1 | 8/2004 | Baker |

(Continued)

FOREIGN PATENT DOCUMENTS

| EP | 1280297 A2 | 1/2003 |
| GB | 2391419 A | 2/2004 |

(Continued)

OTHER PUBLICATIONS

Ganger, G.R., et al., Better Security via Smarter Devices, IEEE 2001, pp. 100-105.

(Continued)

*Primary Examiner* — El Hadji Sall

(57) ABSTRACT

Requests to send data from a first host within a network of hosts are monitored against a record of destination hosts that have been sent data in accordance with a predetermined policy. Destination host identities (not the record) are stored in a buffer. The buffer size is monitored to determine whether requests from the first host are pursuant to viral activity therein.

20 Claims, 15 Drawing Sheets

(56) References Cited

U.S. PATENT DOCUMENTS

| | | |
|---|---|---|
| 6,789,203 B1 | 9/2004 | Belissent |
| 6,886,099 B1 | 4/2005 | Smithson et al. |
| 6,941,348 B2 | 9/2005 | Petry et al. |
| 6,961,341 B1 | 11/2005 | Krishnan |
| 6,965,777 B1 | 11/2005 | Cast et al. |
| 7,032,023 B1 | 4/2006 | Barrett et al. |
| 7,096,498 B2 | 8/2006 | Judge |
| 7,278,159 B2 | 10/2007 | Kaashoek et al. |
| 2002/0013858 A1 | 1/2002 | Anderson |
| 2002/0073338 A1 | 6/2002 | Burrows |
| 2002/0104024 A1 | 8/2002 | Sasage et al. |
| 2002/0199109 A1 | 12/2002 | Boom |
| 2003/0005081 A1 | 1/2003 | Hunt |

FOREIGN PATENT DOCUMENTS

| | | |
|---|---|---|
| GB | 2394382 A | 4/2004 |
| GB | 2401280 A | 11/2004 |
| WO | WO-0203084 A1 | 1/2002 |

OTHER PUBLICATIONS

Johnson, C., Tarpitting with qmail-smtpd, Retrieved from the Internet <http://web.archive.org/web/20021004000235/http://www.palomine.net/qmail/tarpit.html> [retrieved on Mar. 29, 2007], 1 page.

Messmer, E., Behavior Blocking Repels New Viruses, Network World Fusion, Jan. 28, 2002, 4 pages.

Unknown, Packet Filtering, Chapter 6, Nov. 1995, pp. 131-188.

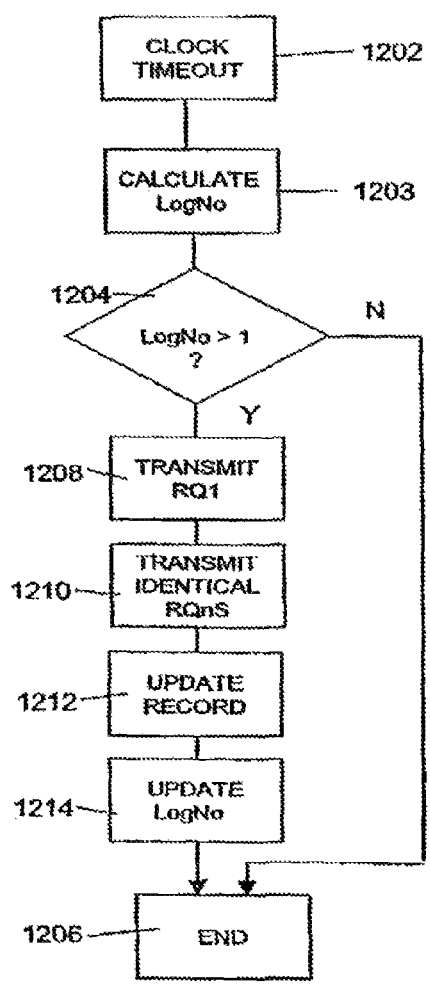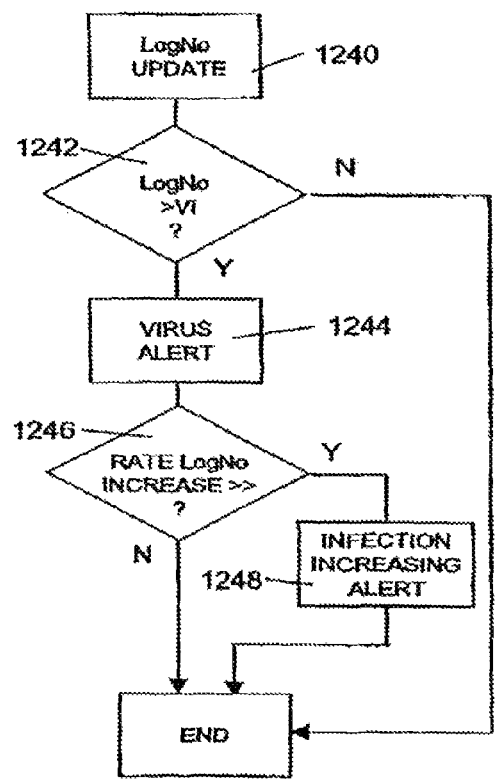
Fig. 12A
Fig. 12B

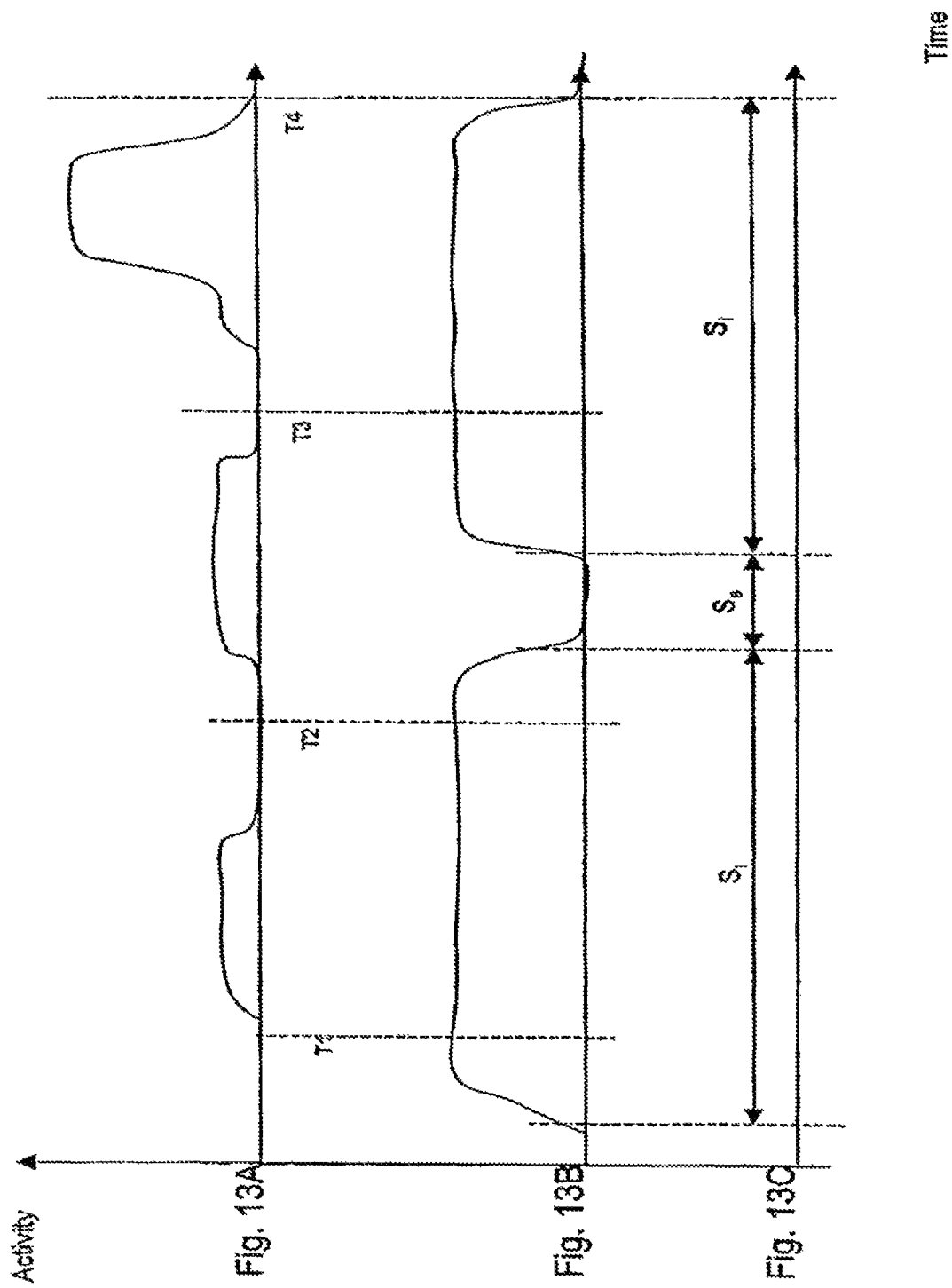

PROPAGATION OF VIRUSES THROUGH AN INFORMATION TECHNOLOGY NETWORK

CROSS REFERENCE TO RELATED APPLICATION

This application is a Divisional Application of and claims priority to co-pending U.S. patent application No. 10/475,091, filed on Jun. 9, 2003, entitled "Propagation of Viruses through an Information Technology Network" which is incorporated herein by reference in its entirety, and also claims priority to United Kingdom Patent Application No. 0309844.9, filed on Apr. 29, 2003, and entitled "Propagation Of Virus Through An Information Technology Network," now granted United Kingdom Patent No. 2401280 issued on Feb. 8, 2006, and United Kingdom Patent Application No. 0224396.2, filed on Oct. 19, 2002, and entitled "Early Data Collection For Virus Analysis," abandoned, and United Kingdom Patent Application No. 0213053.2, filed on Jun. 7, 2002, and entitled "Inserting Delays In Network Connectivity To Restrict The Automatic Propagation Of Viruses Without Interfering With Normal User Behaviour," abandoned. These applications are all incorporated by reference in their entirety.

FIELD OF THE INVENTION

The present invention relates to the propagation of viruses through a network of interconnected processing entities.

BACKGROUND ART

In current network environments virtually any processing entity (or "host") is at one time or another connected to one or more other hosts. Thus for example in the case of an information technology (IT) environment, a host in the form of a computer (such as a client, a server, a router, or even a printer for example) is frequently connected to one or more other computers, whether within an intranet of a commercial organisation, or as part of the Internet. Alternatively, in the case of a communications technology environment, a host in the form of a mobile telephone is, merely by virtue of its intrinsic purpose, going to be connected to one or more other hosts from time to time, and an inevitable result is that the opportunities for the propagation of viruses are enhanced as a result. For example in the case of a computer virus known as the "Code Red" virus, once assimilated within a host the virus operates to generate Internet Protocol ("IP") addresses of other potential hosts at random, and then instructs the host to send a copy of the virus to each of these randomly-generated IP addresses. Although not all of the potential hosts are genuine (since the IP addresses are randomly generated), sufficient of the randomly generated addresses are real addresses of further hosts to enable the virus to self propagate rapidly through the Internet, and as a result to cause a substantial drop in performance of many commercial enterprise's computing infrastructure.

Within the context of this specification a virus is data which is assimilable by a host that may cause a deleterious effect upon the performance of either: the aforesaid host; one or more other hosts; or a network of which any of the above-mentioned hosts are a part. A characteristic effect of a virus is that it propagates either through self-propagation or through human interaction. Thus for example, a virus may act by becoming assimilated within a first host, and subsequent to its assimilation may then cause deleterious effects within that first host, such as corruption and/or deletion of files. In addition the virus may cause self-propagation to one or more further hosts at which it will then cause similar corruption/deletion and further self-propagation. Alternatively the virus may merely be assimilated within the first host and cause no deleterious effects whatsoever, until it is propagated to one or more further hosts where it may then cause such deleterious effects, such as, for example, corruption and/or deletion of files. In yet a further alternative scenario, a virus may for example become assimilated within a first host, and then cause itself to be propagated to multiple other hosts within the network. The virus may have no deleterious effect upon any of the hosts by whom it is assimilated, however the self-propagation through the network per se may be of a sufficient magnitude to have a negative effect on the speed of "genuine" network traffic, so that the performance of the network is nonetheless affected in a deleterious manner. The three examples given above are intended for illustration of the breadth of the term virus, and are not intended to be regarded in any way as exclusively definitive.

It has been established that in situations where viruses are likely to cause deleterious effects upon either one or more hosts, or the network infrastructure as a whole, one of the most important parameters in attempting to limit and then to reverse such effects is the speed of propagation of a virus. Human responses to events are typically one or more orders of magnitude slower than the propagation speeds of viruses, and so substantial difficulties are frequently apt to arise within a network before any human network administrator is either aware of the problem, or capable of doing anything to remedy it. Therefore any reduction in the initial rate of propagation of a virus through a network is likely to be of benefit to attempts to limit any negative effects, and/or to remedy them.

One existing and relatively popular approach to tackling the problems of virus propagation within a network may be thought of as an absolutist approach. Viral infection is prevented using virus-checking software, which attempts to check all incoming data, for example email attachments. If subsequently a virus is discovered within a host, that host is typically removed from the network immediately, and disinfected once the nature of the virus has been established. In accordance with this philosophy each host may be thought of as contributing to protecting the network against widespread infection firstly by avoiding incidence of infection, and secondly in the event of infection, by its sacrificial removal from the network.

SUMMARY OF THE INVENTION

The present invention provides alternative approaches to infection and propagation of viruses in a network of hosts.

According to one aspect of the invention, a method of restricting propagation of viruses in a network having a plurality of hosts comprises the steps of: (1) monitoring network traffic from a first host of the plurality and establishing a record which is at least indicative of identities of hosts to whom data has been sent by the first host; and (2) limiting passage of data from the first host to other hosts within the network over the course of a first time interval, so that during the first time interval the first host is unable to send data to more than a predetermined number of hosts not in the record.

Another aspect of the invention relates to a host having a gateway for outbound data. The gateway is adapted to: (1) monitor requests to send data to other hosts; (2) maintain a record of identifies of hosts in a network to which data has been sent: and (3) prevent dispatch of data to another host within the network whose identity is not in the record.

A further aspect of the invention is related to a method of operating a host within a network of a plurality of hosts. The method comprises the steps of: (1) monitoring requests to send data to other hosts in the network over the course of successive intervals of time; and (2) for each interval of time, creating (a) a dispatch record for requests that have occurred within the scope of a policy, and (b) a buffer record for requests that have occurred outside the scope of the policy.

Preferably the dispatch record contains data entries identifying destination hosts to whom data has been sent. A maximum number of entries the dispatch record can contain is defined by the policy.

The dispatch record is preferably periodically updated at predetermined time intervals to indicate identities of destination hosts to whom data has most recently been sent in accordance with the policy. The policy permits data to be sent to a predetermined number of destination hosts (which are not identified in the dispatch record) during each of the time intervals.

After updating, the dispatch record preferably identifies a predetermined number of destination hosts to which data has most recently been sent in accordance with the policy.

Updating the dispatch record preferably includes deleting an entry identifying a destination host from the dispatch record and replacing the deleted entry with an entry identifying a destination host to whom data has more recently been sent.

The buffer record preferably includes a plurality of entries each identifying a request to send data to destination hosts which are not identified in the dispatch record. Each entry in the buffer record identifies the destination hosts in respect of which the request was made.

Preferably, upon receipt of a request to send data to a destination host, the destination host's identity is compared with destination hosts identified in the dispatch record. If the dispatch record does not identify the destination host, an entry to the buffer identifying the aforesaid request is added.

A number of entries are removed from the buffer record in accordance with policy at the end of a time interval. The buffer record thereby provides, following the removal step, a record of requests to send data which are outside the scope of the policy. The policy may specify removal of a predetermined number of entries on a first in, first out basis.

A determination of whether the aforesaid number is above or below a threshold defining viral infection is preferably made by monitoring the number of entries identified in the buffer record.

Preferably a signal is generated in response to an indication that the rate of increase of the buffer record exceeds a threshold value.

Preferably, the record is established by monitoring the identities of hosts to which data has been sent by the first host over the course of a further time interval preceding the first time interval.

The record is preferably updated to include the identity of at least one host to which data was sent by the first host during the first time interval and which was not in the record during the first time interval.

The record preferably includes a predetermined number of identities. Upon updating the record with the identity of a host not previously in the record the identity of a host previously stored in the record is deleted from the record.

The first and further time intervals are preferably of equal predetermined durations.

Preferably, there is a determination of whether a request to send data from one host to another host includes at least one sub-request to send further data to a further host on whose behalf a destination host specified in the request acts as a proxy for receipt of the further data.

A further record is preferably established of other hosts within the network having an identity specified in a sub-request. The passage of further data from the first host to other hosts within the network is limited during the first time interval, so that during the first time interval the first host is unable to send further data to more than a predetermined number of hosts not in the further record.

Preferably requests to contact hosts not in the record are diverted to a delay buffer. At the end of the first time interval, the predetermined number of requests is transmitted from the delay buffer.

Preferably a signal is generated in response to a determination indicating the size of the delay buffer exceeds a predetermined size.

A signal is also preferably generated in response to a determination indicating the rate of increase of the size of the delay buffer exceeds a predetermined rate.

A signal is also preferably generated in response to a determination indicating there is an increase in the size of the delay buffer per time interval that exceeds a predetermined size.

A signal is also preferably generated in response to a determination indicating the size of the delay buffer exceeds a predetermined size for a predetermined number of successive time intervals.

Preferably the value of a parameter "slack" is determined based upon a number of successive time periods that pass when no new requests are made to send data from the first host to hosts not in the record. In response to slack exceeding a predetermined value un-impeded passage of data from the first host to other hosts not in the record is allowed.

Requests to contact hosts not in the record are preferably diverted to a delay buffer. Slack is based upon a number of successive time periods during which the buffer is empty.

Slack is preferably decremented each time an un-impeded passage of data from the first host to a host not in the record is allowed.

The method preferably includes varying with time at least one parameter selected from the group consisting of: number of hosts in the record; and the predetermined number of hosts not in the record. At least one of the parameters is varied as a function of time of day and/or in response to a perceived threat level.

Preferably at least one of the parameters is changed between a first set of values and a second set of values at a predetermined rate or is randomly changed according to a predetermined probability distribution as a function of time.

Preferably the method includes varying at least one parameter selected from the group consisting of: (a) number of hosts in the record; and (b) the predetermined numbers of hosts not in the record that govern the operation of the method; and determining the value of at least one of the parameters by performing an automated search on a set of data indicative of normal network traffic.

Steps of the method also preferably comprise: (1) receiving a request to send a multiple recipient email; (2) determining the value of a parameter ("mslack") based on a number of successive time periods that pass when no multiple recipient emails are sent from the first host; and (3) allowing un-impeded passage of the multiple recipient email in response to mslack exceeding a predetermined value. The multiple recipient email is allowed un-impeded passage if mslack is greater than or equal to a number of intended recipients of the email. MSlack is set to zero after the multiple recipient email has been sent.

The gateway is preferably adapted to (1) monitor requests to transmit data to another host within the network over the course of a series of time intervals, and transmit data to another host within the network, wherein the identity of the another host is not in the record on a predetermined number of occasions in any given time interval.

The gateway is adapted to divert request to a delay buffer. The diverted requests are to network hosts having identities that are not in the record.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIGS. 12A and B are flow charts of further aspects of a method;

FIGS. 13A-C are waveforms helpful in describing the operating of an aspect of the invention;

DETAILED DESCRIPTION OF THE DRAWINGS

Figure 1:
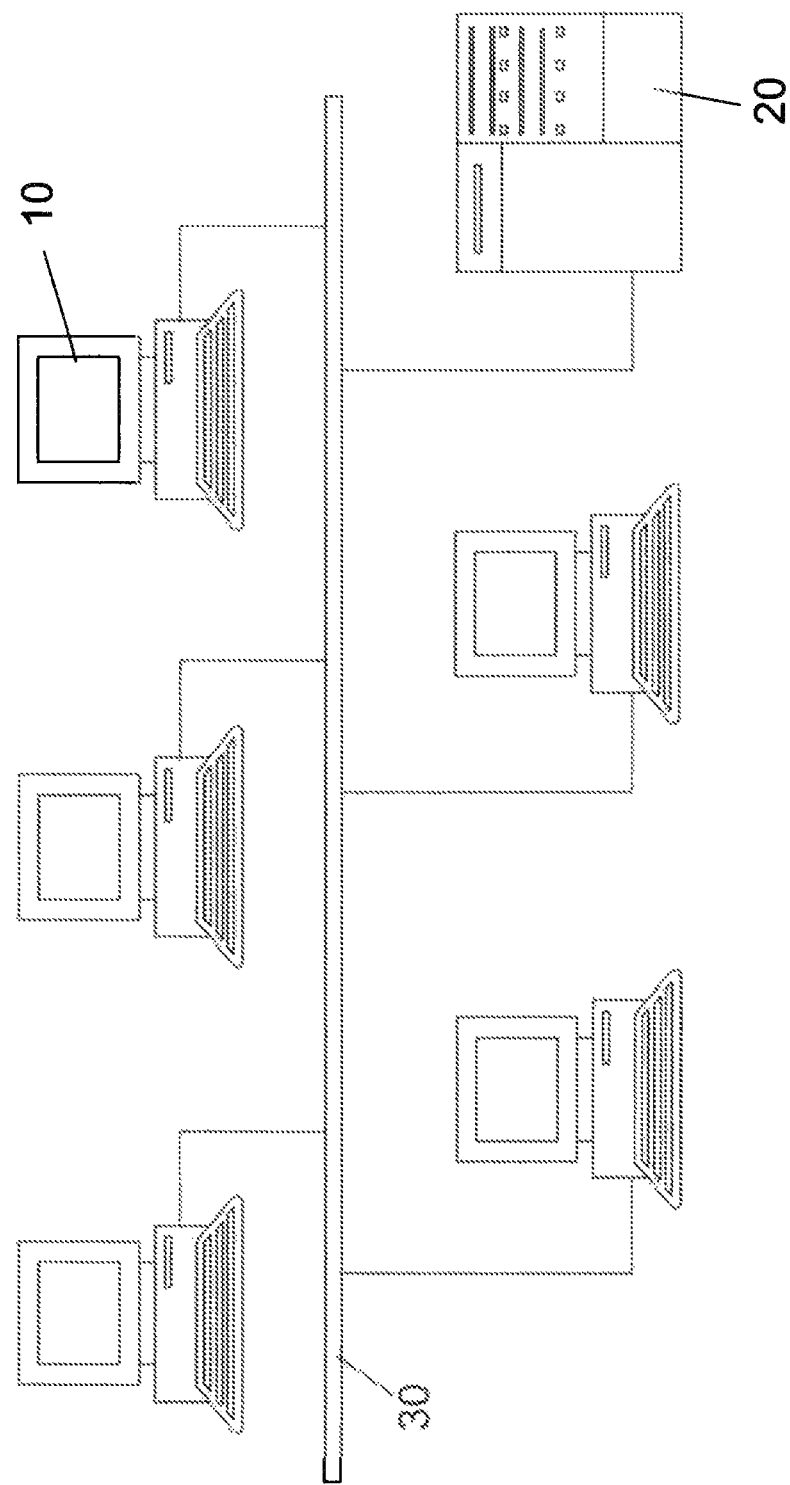
FIG. 1 is a block diagram of one form of a typical prior art network architecture.
Figure 2:
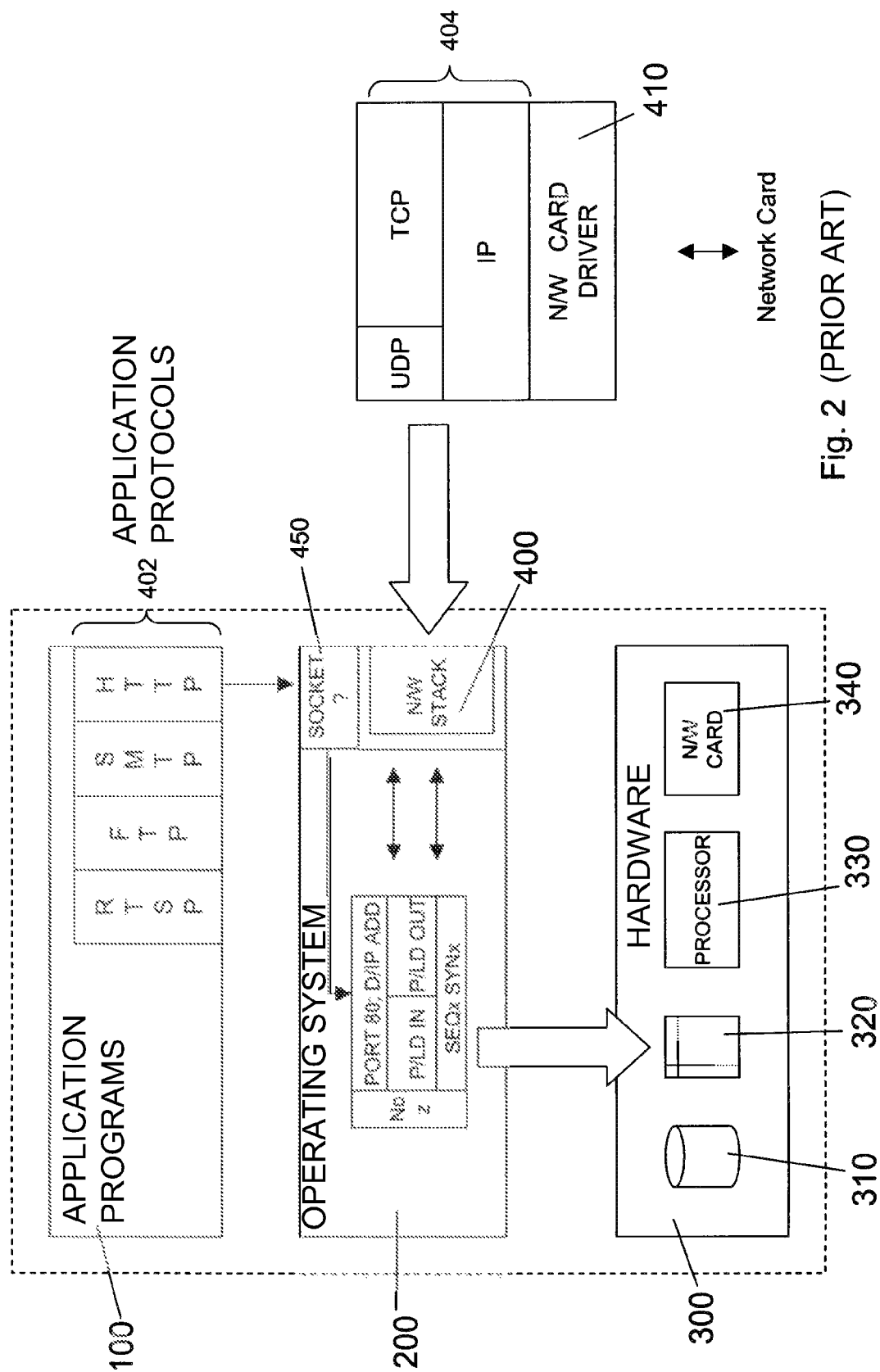
FIG. 2 is a schematic illustration of the conventional operational architecture of a computing entity forming a part of, for example, the network of FIG. 1.

Referring now to FIG. 1, one typical form of network includes a plurality or client computing entities 10, and a server computing entity 20 each of which is connected to a network backbone 30. In the present example, each of the computing entities has a similar architecture enabling dispatch and receipt of data from other entities connected to the network. Referring now to FIG. 2, each of the entities 10 includes what may be thought of as three functional parts: one or more application programs 100, which in general terms may be thought of as enabling implementation of a particular task that a user of the entity may wish to perform, such as browsing the Internet, word processing and so on; hardware 300 (such as a hard drive 310, memory 320, a processor 330, and a network card 340); and an operating system 200. The operating system 200 can be thought of, in part, as an interface between the application programs 100 and the hardware 300, performing scheduling of tasks required by application programs 100, system 200 allocates memory and storage space amongst other things. The operating system 200 typically, in accordance with this way of describing the architecture of a computing entity, includes a hierarchy, or stack 400 of programs which provide entity 10 with the ability to dispatch and receive data to and from other entities in the network, in accordance with a number of different sets of formal rules governing the transmission of data across a network, known as protocols. The network stack 400 can be thought of as being inserted into the operating system 200 so that stack 400 and system 200 operate in conjunction with each other. The stack 400 includes a strata of low level programs which perform low level protocols 404, concerned for example with the formation of bundles of data known as "packets" (which are discussed in more detail later), the order in which bytes of data are to be sent and, where appropriate, error detection and correction. A further, high level strata of protocols usually implemented within applications programs ("application protocols"), apply in conjunction with the low level protocols to provide for the dispatch and receipt of data at the behest of applications programs. In the present example the application program uses four different high level protocols 402; RTSP (real time streaming protocol), FTP (file transfer protocol), SMTP (simple mail transfer protocol—used for email), and HTTP (hyper text transfer protocol—used primarily in internet related applications), and the operating system implements two low level protocols 404: UDP (User Datagram Protocol for use with RTSP), and TCP (Transfer Control Protocol for use with the remaining three application protocols), both low level protocols being implemented above, and in conjunction with Internet Protocol (IP). Finally, the network stack 400 includes a system program known as a driver 410 for the network card, which in essence is low level software that controls the network card.

In the illustrated examples, the process of establishing a connection in accordance with HTTP will be considered. Usually a request for such a connection is made by the web browser application program, and this in turn is most likely to be at the behest of a user operating the web browser. Where this is the case, the request will identify the address or "URL" within the network of the computing entity with which a connection is sought, initially using alphanumeric characters entered at the address bar of the browser application program (for example http://www.hp.com). Ultimately however these are "resolved" into a numerical "IP address" of the form: xxx.xxx.xxx.xxx, where xxx is an integer between 0 and 255 inclusive. An example of an IP address is 192.168.2.2. The IP address is subsequently further resolved into what is known as a physical, or Media Access Control ("MAC") address of the network card of the destination computing entity. Resolution of the URL into an IP address, and the IP address to a MAC address usually takes place at dedicated computing entities within the network, in a manner which is well known per se, and will not be described further herein. This description of the connection process in accordance with HTTP, well known per se, has described connections legitimately requested by a user, and by means of a URL. However it should be appreciated that it is possible for example to request a connection from the web browser application program using an IP address, rather than the alphanumeric characters of the URL. This is an aspect of the system behaviour which has been exploited by viruses, some of which randomly generate IP addresses in accordance with the rules governing their allowable format, and then seek connection to those randomly generated addresses.

Figure 3:
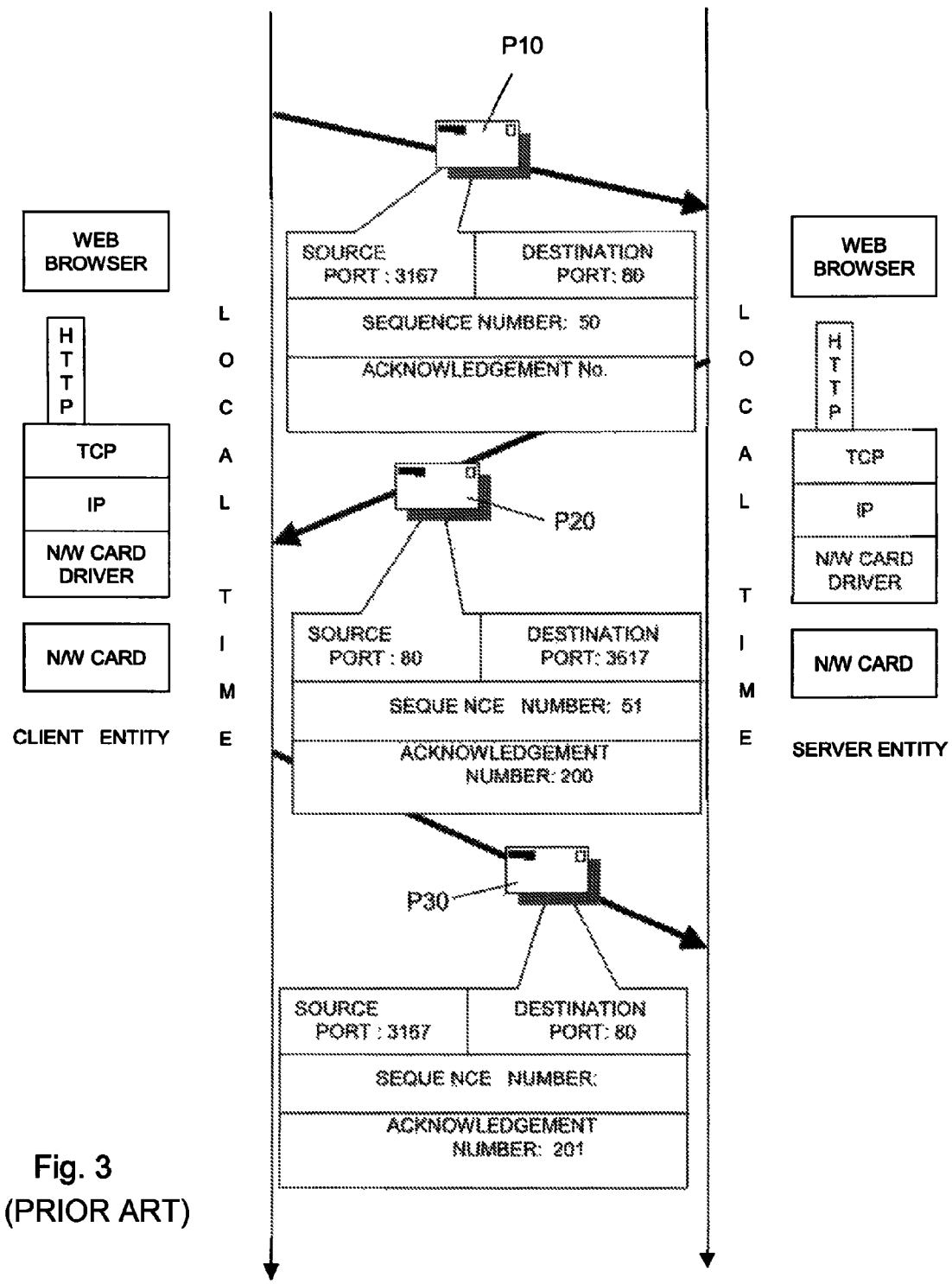
FIG. 3 is a flow diagram of how a connection is established in accordance with an application protocol from FIG. 2.

In the context of the present document it should be appreciated that the term "connection" is a term of art, and is used to refer to a manner of transmitting messages in which acknowledgement of receipt of data is required, so that in the absence of an acknowledgement the connection is deemed either not to have been established, or to have failed, and the transmitted message deemed not to have arrived. One application protocol which operates using connections is HTTP, and an example of the establishment of a connection in accordance with HTTP will now be described with reference to FIGS. 2 and 3. A connection in accordance with HTTP is typically established at the behest of a web browser application program (i.e. a program in the applications layer 100 in FIG. 2) within the client entity, which requests a connection with a server entity, for example. When an application program such as a web browser seeks to establish a connection with another computing entity, it initially requests what is known as a socket from the operating system. A socket is effectively an allocated memory space in which data relating to the communication sought by the web browser (in this instance) is stored.

Upon receiving a request for a socket, the operating system duly creates or "opens" one (which in effect means that memory is allocated), and returns a socket number, which is the identifier for that particular socket. In FIG. 2 the particular socket is indicated by reference numeral 450, and the number of the socket is "z", while the part of the operating system which allocates the socket is shown as a "layer" above the network stack, by which it is sought to indicate that, from a methodological perspective, use of the socket (further uses of which will subsequently be described) in the case of outgoing data, precedes the passage of data from the application program through the network stack. Once a socket has been opened, the web browser then requests that the socket z is "bound" firstly to the IP address with which a connection is sought, and secondly is a parameter known as the "port" number (which is essentially a label identifying the application protocol used), by writing these parameters in the socket (which in due course will additionally contain further data). The port number for connections via HTTP is usually port 80. Once a socket has been created and bound the browser then requests that a connection be established, and this causes the emission of what is known as a data packet P10 (shown in FIG. 3) to the destination computing entity. The requesting packet P10 contains; an identification of the destination port, i.e. an identification of the suitable application protocol for handling messages transmitted over the requested connection (here, because the connection is established in accordance with HTTP, port 80); a source port (here 3167) which is an arbitrary number (but one which is not: (i) already in use at that time, and (ii) not already allocated as a standard number to define a port identified in accordance with established standards) whose purpose is to provide, to the client requesting the connection, an identification of the connection in acknowledgement messages (e.g., since it is entirely possible that there may simultaneously be two are more connections using the same protocol this may be used to distinguish one such connection from the other); a flag indicating that the synchronisation status of the requesting entity is set to "on" (meaning that sequence numbers—which indicate the order of the packet in a total number of packets sent—between the requesting and destination computing entity are to be synchronised), and an initial sequence number 50 (this could be any number). Upon receipt of this packet, the destination machine sends back a packet P20 identifying the source port as 80, the destination port as 3167, a flag indicating that the acknowledgement status is "on", an acknowledgement number 51 which increments the sequence number by one, and its own synchronisation flag number 200. When the requesting entity receives this packet it returns a further packet P30 once again identifying the source and destination ports, and a flag indicating that its acknowledgement status is on, with an acknowledgement number 201 (i.e. which increments the sequence number by one). Once this exchange is complete, a connection between the client and server entities is defined as being open, and both the client and server entities send messages up through their respective network stacks to the relevant application programs indicating that a connection is open between them. In connection with the socket, it should also be noted that the socket comprises an area 460 allocated to store the actual body of the message which it is desired to transmit (sometimes known as the outbound message content, or the outgoing payload), and similarly a further area 470 allocated to store the body of messages which are received (inbound message content, or incoming payload).

When the outgoing payload is to be transmitted, the TCP layer breaks it up into packets (i.e. data structures such as those illustrated above in FIG. 3, but further including at least part of the payload), and the IP layer attaches an IP address header. When an incoming message arrives, it passes up through the network stack, i.e. from the network card 340, up through the Internet Protocol software, etc., and is written in to the relevant socket (as identified, inter alia from the port number), from which the application program retrieves the incoming payload.

Data may alternatively be transmitted using the protocols RSTP/UDP/IP (indicating the hierarchy of protocols in the network stack adopted in conjunction with each other to transmit the data) which do not require a connection; the dispatching entity sends a packet to the destination entity, and does not require an acknowledgement of receipt.

Figure 4:
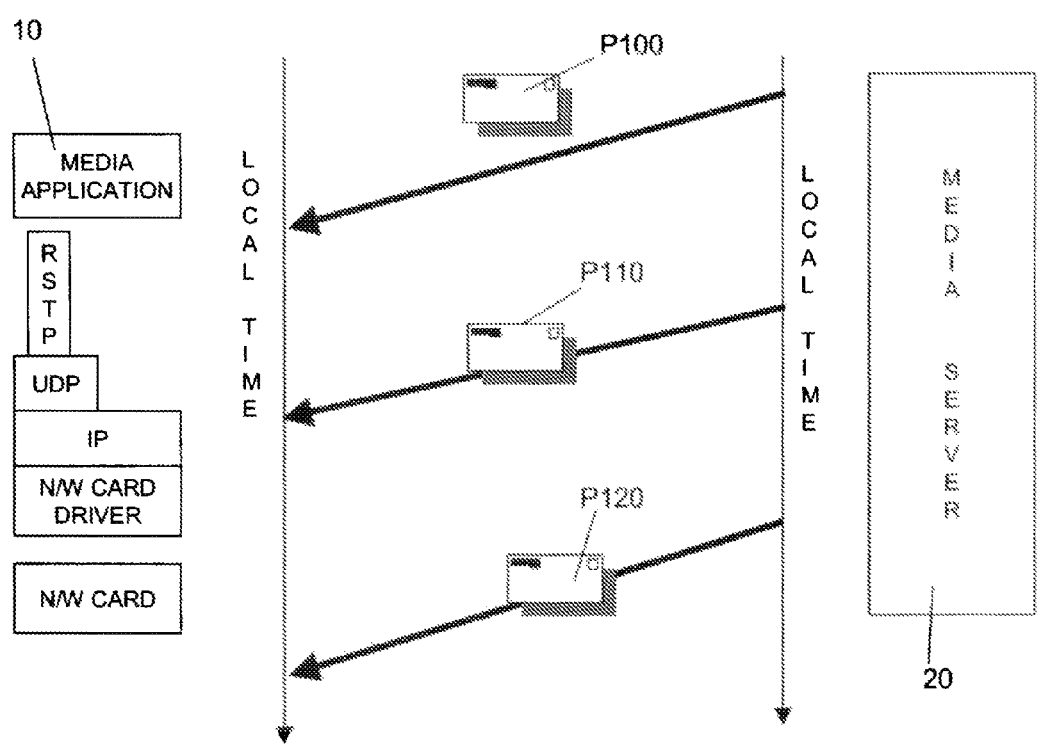
FIG. 4 is a schematic illustration of data transmission in accordance with a further application protocol from FIG. 2.

Referring now to FIG. 4, when transmitting data in accordance with RTSP/UDP, media for example is streamed to a client entity 10 from a media server 20 in a series of packets P100, P120, P120 . . . , and the client does not acknowledge receipt of any of them. Streaming in accordance with this protocol typically follows an initial request to establish a connection between the client and the server by some other connection based protocol, for the purpose of identifying a destination port on the client, amongst other things.

Thus far all that has been described is entirely conventional.

Figure 5:
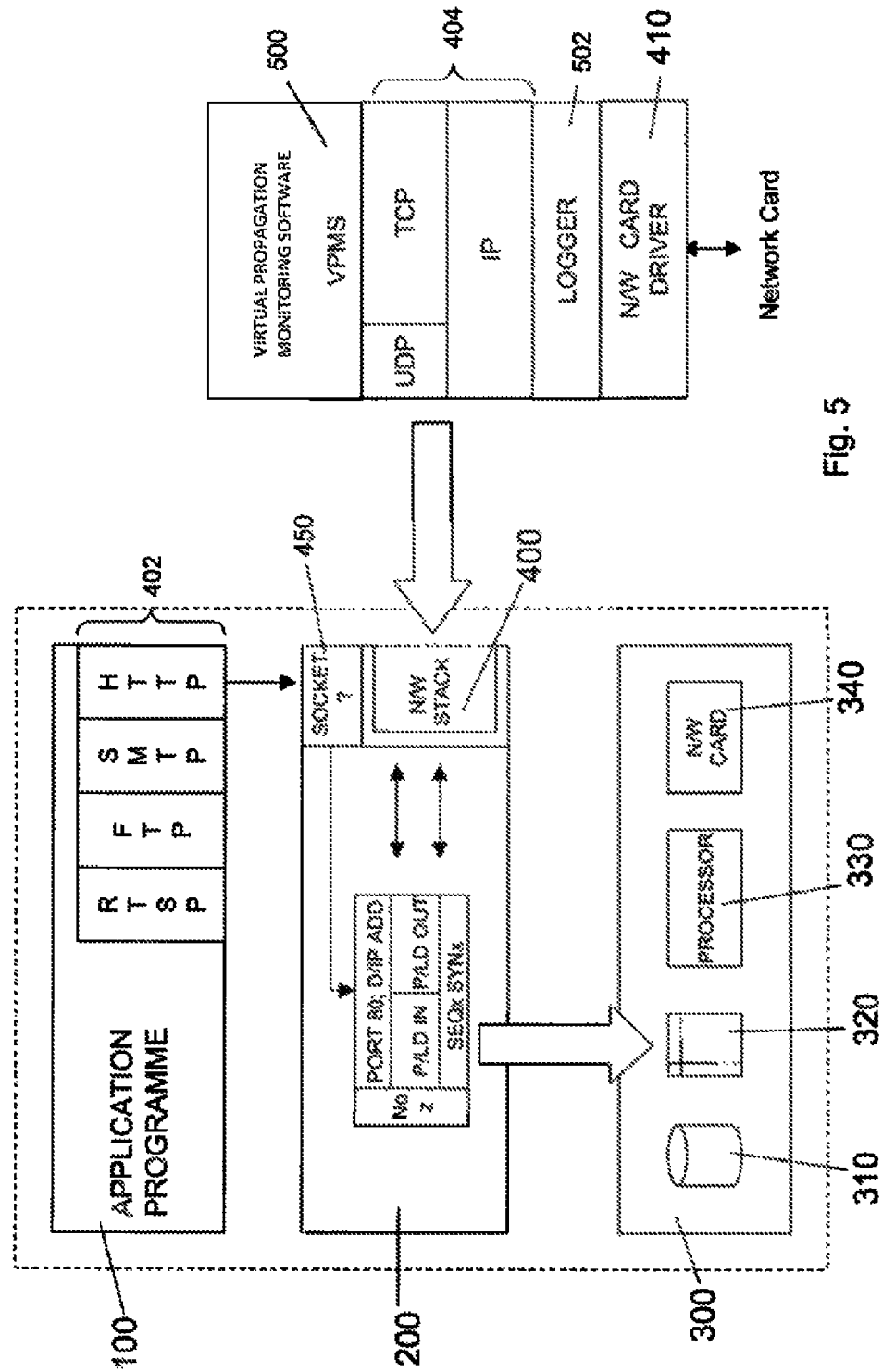
FIG. 5 is a schematic illustration of an operational architecture according to an embodiment of the present invention of a computing entity forming a part of a network.

Referring now to FIG. 5, in accordance with a first embodiment of the present invention, a layer of viral propagation monitoring software (VPMS) 500, runs within the network stack of one or more machines (i.e., computer entities 10) within the network. The VPMS acts as a gateway for all outbound data from the computing entity 10 on which it is running, and operates to monitor the propagation of viruses within the network by observing what is, in accordance with a predetermined policy, defined as "unusual" behaviour in contacting other entities (also known as "hosts", since they may act as hosts for viral infection)

within the network. In many networks, normal network traffic (i.e. non-virally related) is characterised by a relatively low frequency of events in which data is sent to destination hosts (i.e. hosts which are the intended destination for data) within the network which have previously not been contacted. In contrast, virally-related traffic is often characterised by relatively high frequency events in which data is dispatched (or attempts are made to dispatch data) to previously uncontacted destination hosts. Broadly speaking, the function of the VPMS is to monitor abnormal and therefore possibly virally-related traffic, as defined in accordance with a predetermined policy, and to record such abnormal traffic.

In the present example the VPMS operates upon the basis of a series of time intervals or time windows, which in the present illustrated example are of predetermined and constant length $T_n$. In any given time window $T_n$ the VPMS monitors requests to send data to "new" destination hosts, i.e. destination hosts whose identities differ from those specified in a record of identities of destination hosts most recently contacted. The record only holds a predetermined number N of destination host identities, so that a destination host is classified as new if it is not one of the N most recently contacted destination hosts. The number of new hosts allowed per time window, and the value of N are determined on the basis of the policy, typically defined by a system administrator, and the policy is preferably formulated to take account of the nature of non virally-related network traffic. In this way, the VPMS operates to monitor the speed at which a virus resident on the host propagates from that host to other hosts within the network.

Referring to FIG. 6A, over the course of a time window T1, various applications programs running on the workstation (i.e., one of computer entities 10) send requests via the VPMS to send data (whether by connection or otherwise) to other hosts within the network ("outbound requests"): the email application program, which requests dispatch of an email message (having multiple addressees) to a mail server, Mail (Request A) using SMTP, the file management application program requesting dispatch of a file recording a text document to another user (Request B) via FTP, and the web browser program which requests connection, (typically via a Web Proxy server), W/Server in order to connect to a site using HTTP (Request C). In the present example, outbound requests to the VPMS from each of these hosts are requests to send data to an identified destination host, and are ultimately manifested by the dispatch of one or more data packets in accordance with the relevant application protocol. The term "request" is intended to be interpreted broadly to encompass any indication (usually from an application program, although by no means necessarily) that contact with a destination host is sought, and for ease of terminology, the transmission of a request is to be interpreted as indicating that data is transmitted pursuant to a request to transmit such data.

Figure 6:
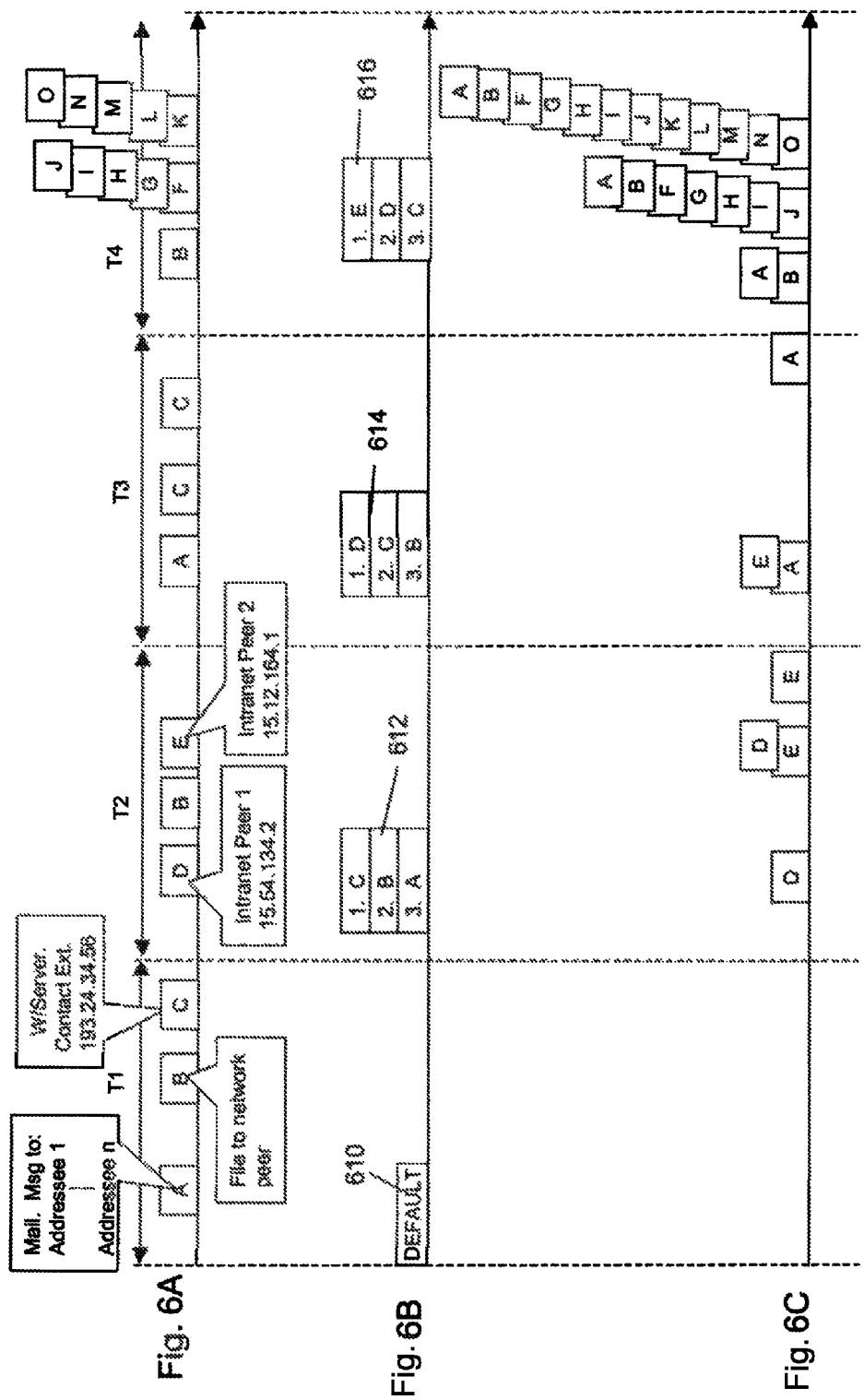
FIGS. 6A-C illustrate examples of events that may occur in accordance with a method shown in FIG. 7, according to an embodiment.
Figure 7:
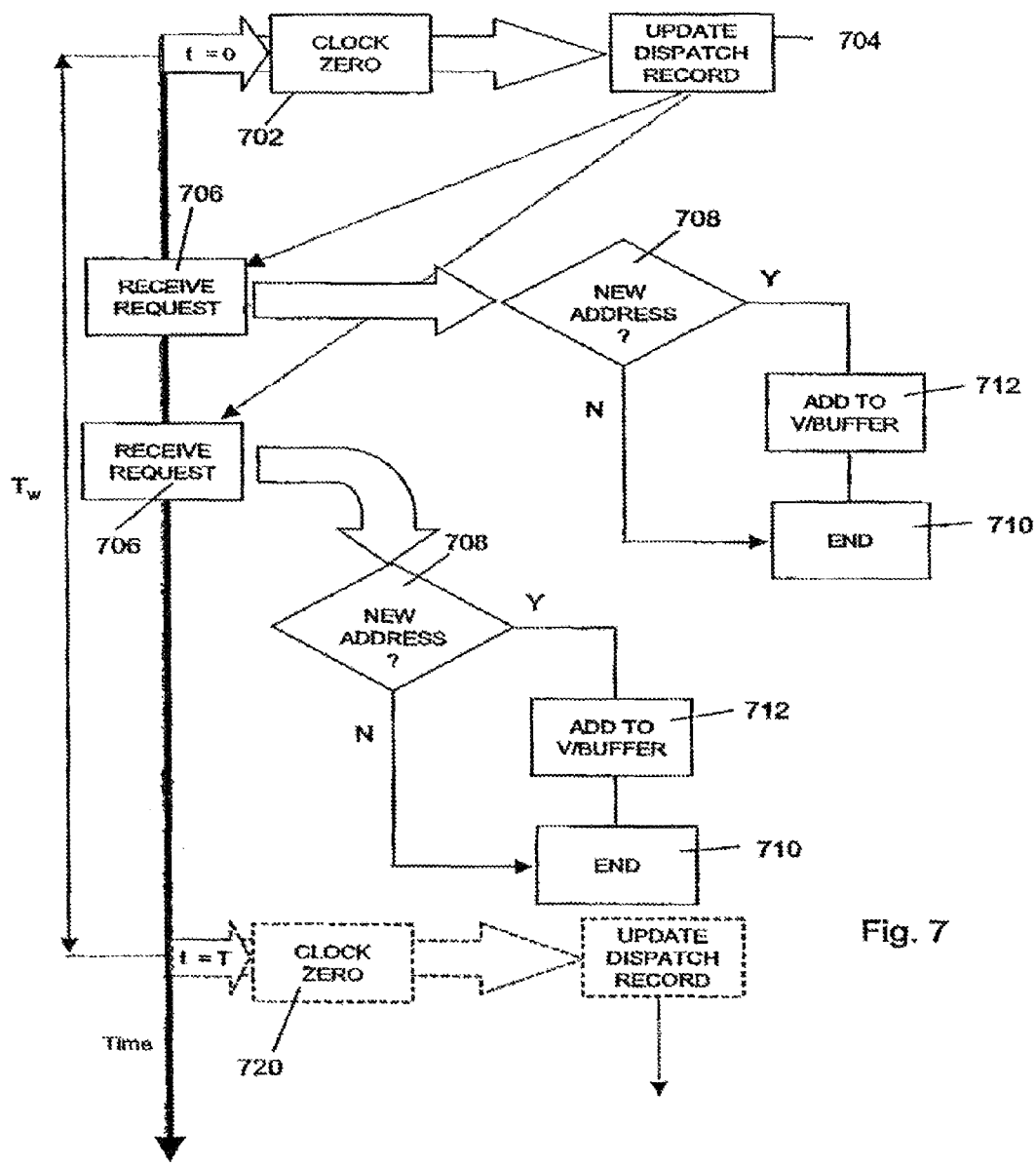
FIG. 7 is a flowchart illustrating the operation of the method of FIGS. 6A-C.

The VPMS, a computer program in entity 10, operates in accordance with the flow diagram illustrated in FIG. 7, whose features will now be described in more detail in conjunction with FIGS. 6A-C. FIG. 7 should be regarded as a generic flow diagram of the operation of the VPMS routine, rather than a specific flow diagram of individual events depicted in FIG. 6. As described above, the VPMS operates with reference to a series of time intervals, or windows, which in the example of FIG. 6 are of constant length. The VPMS program is initiated at step 702 by a clock (typically the clock which defines the time windows) indicating that a time window has commenced. At step 704 the VPMS program then updates a dispatch record, which is a record of the identities of a predetermined number N (which in this example is 3) of destination hosts most recently contacted (in accordance with the policy—see later) the previous time window. During step 704 the updated dispatch records are stored, as shown for each time window in FIG. 6).

At this point, the VPMS program is effectively in a waiting mode until the program receives a request to send data at step 706 (a dotted arrow from step 704 indicating that receipt of request occurs temporarily after step 704 but is not consequential to its occurrence). This is a step whose occurrence is entirely outside the control of the VPMS since it usually is initiated at the behest of an application program, as is the case with Requests A, B and C. Each of these requests passes, to the VPMS, through the relevant application protocol layer in the network stack from the respective application program by which they were generated, this event is labelled in FIG. 7 as step 706. Step 706 may be thought of as a triggering event, so that when a request passes into the VPMS, the identity of the requested destination host specified in the request is matched with the dispatch record. This matching process therefore determines whether the requested destination host is a new host, and is represented at step 708. In the present example, somewhat artificially, but nonetheless serving to illustrate the desired principles, the time interval T1 is the first time interval after start-up of the computing entity. The VPMS therefore matches the destination host identities for each of the Requests A-C against identities held in a "default" dispatch record 610 for the time period T1 which, in the illustrated example, is simply a record of the three hosts most frequently contacted during the lifetime of the host on which the VPMS is running. In the present example the three most frequently contacted hosts, and therefore the three identities retained in the default dispatch record, are those of the mail server (Request A), the file server (Request B) and the web proxy server (Request C). Each of the three outbound requests from the workstation during the time period T1 identifies a destination host matching one of the three host identities in the default dispatch record. Therefore none of the requests is seeking to establish contact with a new destination host and the VPMS therefore takes no action and simply ends at step 710.

During the second time interval T2, three further outbound requests are received, identifying host destinations "Intranet Peer 1" (Request D), Request B (described above) and "Intranet Peer 2" (Request E). As in the previous time window, as each request triggers an individual VPMS routine for that request, i.e. a step 706 as it passes through the VPMS, and is followed by the step 708 of matching the identity of the host destination in the request with the identities present in the dispatch record 612 for this time window, T2 is performed in order to establish whether the request is new. The dispatch record however is now a genuine record of the identities of the three hosts contacted most recently during the previous time window T1 (although coincidentally this is identical to the default dispatch record). Upon receipt of Request D, the consequently triggered VPMS program for that request establishes at step 708 that the identity of this host is not in the dispatch record 612, i.e. that it is a new destination host. The program therefore proceeds to step 712 and then ends at 710. In step 712 the VPM S program adds a copy of the Request D as an entry to a virtual buffer in VPMS; the virtual buffer contents are shown in FIG. 6C. In one preferred embodiment, the entire contents of the socket relating to Request D are duplicated to form the entry in the virtual buffer. However in an alternative embodiment, where for example the payload is large, this is omitted. On receipt of Request B, the VPMS establishes at a step 708 that B is present in the dispatch record, and so the VPMS routine ends at step 710. Request E is also a new request within the time window T2 and so at a step 712 the identity of host E is added to the virtual buffer.

Because receipt of requests is the trigger for the commencement of the program illustrated in FIG. 7, neither the number of occasions in a given time window in which the VPMS routine is run, nor the timing of their commencement can be known in advance. Additionally, as illustrated in FIG. 7, it is possible for two (or indeed more, although only two are illustrated in FIG. 7) programs to be running in temporal overlap, since one might still be running when another is triggered by a further request. Similarly, a request may trigger the execution of the program of FIG. 7 just prior to the end of a time window (a situation also illustrated in FIG. 7, with steps which occur at the end of a time window/the beginning of a subsequent time window being shown in dashed lines), so that the execution of the program may overlap temporally with a part of the next time window. The approach taken by this particular embodiment to this issue of overlap is relatively simple; if at the commencement of time window $T_{n+1}$, the update of the dispatch record for a previous time window $T_n$ has been completed during the simultaneous running of a VPMS routine commenced in the previous time window $T_n$, but prior to execution the step 712 (adding a request to the virtual buffer) for that program, the subsequent update of the virtual buffer in that step 712 will be treated as if performed for a request received in the current time window $T_{n+1}$. This approach has the benefit of being simple, although it may on occasions yield minor inaccuracies, with a request being recorded as being outside of the policy simply because processing of the request received and initially processed during one time window extended into the next time window, but this is not significant overall.

At the end of the time window T2, the virtual buffer of VPMS program 500 contains two new requests. At this juncture (i.e. at end of time period T2), the policy which the VPMS is designed to monitor comes into play. In the present example, the policy provides that a single new host is contacted per time interval. This element of the policy is monitored by a first buffer management routine of VPMS program 500. The first virtual buffer management routine is illustrated schematically in flowchart form in FIG. 8A, and begins at step 802 with the advent of a clock timeout, that is to say that the clock (not shown) which defines the time intervals $T_n$ has completed another time period, following which, at step 803 the program counts the number of requests in the virtual buffer to update the variable known as LogNo, i.e., the number of entries (each identifying a request) in the virtual buffer at any moment. At step 804 the program determines whether there are any entries in the virtual buffer by examining the value of LogNo, to determine whether its value is greater than 0. If there are no entries in the virtual buffer the routine ends at step 806. In the present illustrated example, however, during time interval T2 entries for two requests, D and E have accumulated in the virtual buffer. Therefore the program proceeds to step 808, at which the entry for the first request RQ1 (i.e. the one which has been in the buffer for the longest time) is deleted from the buffer. Optionally, at step 810, the program then searches the buffer for other entries specifying the same destination host and deletes any such entries, since they are effectively regarded as one entry identity. Alternatively, step 810 can be omitted. The program then advances to step 812 during which the dispatch record is updated so that it accurately stores the identity of the three hosts most recently contacted in accordance with policy. It should be noted that the dispatch record does not therefore necessarily reflect the identities of hosts which have most recently actually been contacted, if requests to these hosts are outside of the policy. For example in this case the destination host of Request E, which although contacted, was not contacted in accordance with the policy of one new destination host per time interval. This updating of the dispatch record is indicated in FIG. 6B, where the dispatch record contains the identities of Requests D, C, B. The final step in the first buffer management routine is the updating of the value of the variable LogNo denoting the size of the virtual buffer, which in this example, following the transmission of the Request D, is one (i.e. the single Request E). Thus, in the present embodiment at the end of each time interval the virtual buffer is effectively a record at any instant of requests which have been transmitted outside that policy. This result is achieved in the same way that the dispatch record is a record of recent requests which have been transmitted in accordance with policy.

One role of the virtual buffer of the VPMS program is to enable a determination to be made with regard to whether the host upon which the VPMS is running is virally infected. One way in which this can be manifested is the size of the virtual buffer. A state of viral infection can therefore be defined in terms of the size of the buffer, and the stage of any such viral infection by the rate of change of the buffer size. This follows from the generally different behaviour of virally-related and non virally-related network traffic, in that non virally-related or "legitimate" network traffic usually involves contacting only a relatively small number of new destination hosts. Because viruses tend to propagate by transmission to as many disparate destination hosts as possible, an instance of a large number of requests to contact a new destination host is typically indicative of viral infection. The virtual buffer can be thought of as a queue of virtual new requests waiting for opportunities to be virtually transmitted in accordance with policy (since their "counterpart" real requests are simply transmitted without hindrance). The size of the virtual buffer is therefore one indication of whether there is a viral infection, since a large buffer size is indicative of a large number of requests to contact a new host within a short space of time. An alternative indication of viral infection is the existence of an increasing buffer size. Conversely, generally speaking, a buffer size which is steadily declining from a relatively high value might be indicative of a temporary increase in legitimate traffic levels. It can be seen therefore that buffer size can be used to interpret the existence of viral infection with varying levels of complexity, the interpretation typically being something which is defined in the policy.

Figures 8A, 8B:
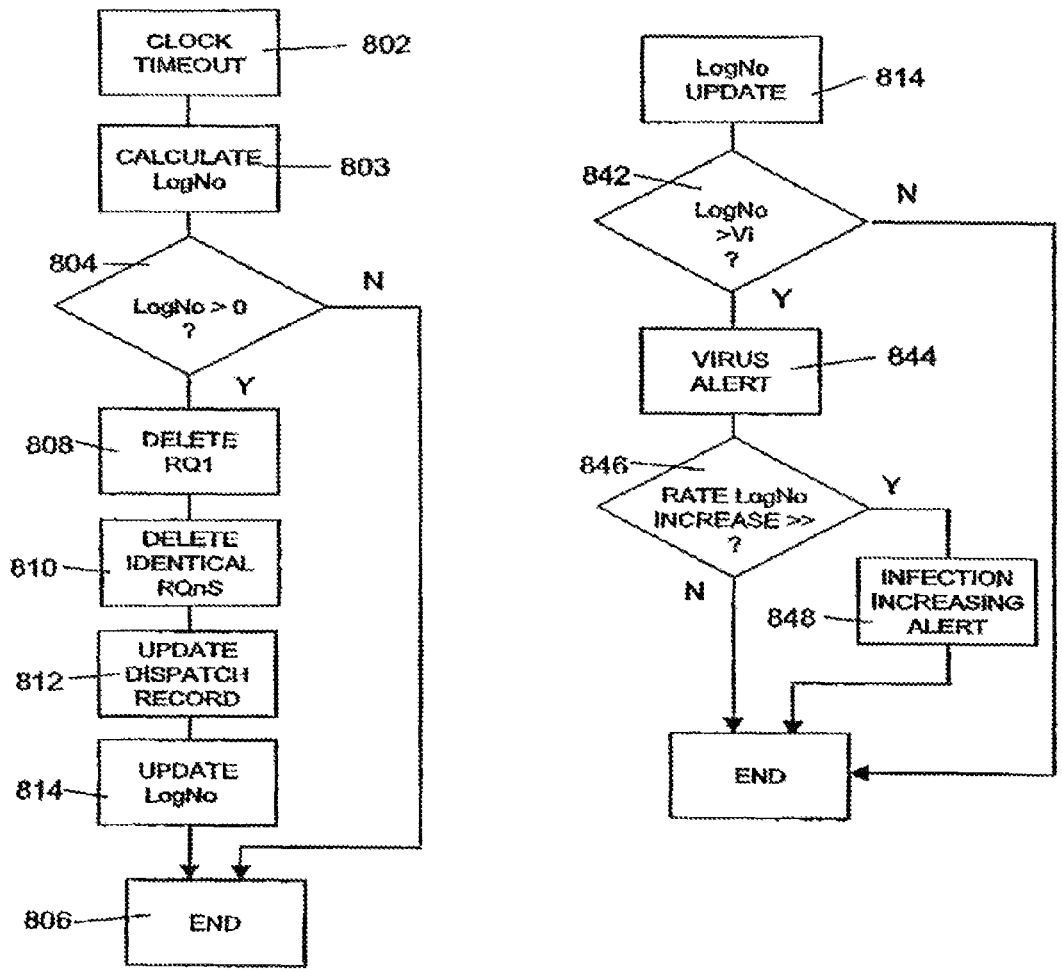
FIGS. 8A and B are flowcharts illustrating further aspects of embodiments of methods.

A second buffer management routine, illustrated in FIG. 8B, monitors the virtual buffer, and is triggered by performance of step 814 from the routine of FIG. 8A, or from step 803, or from step 712 in FIG. 7 i.e. an update in the value of the variable LogNo. The program advances from step 814 to decision step 842, during which the program determines whether the size of the buffer is greater than a quantity $V_i$, which the policy has determined represents viral infection. In response to decision step 842 making a "yes" determination the program advances to step 844 during which the program generates a virus alert. The virus alert may simply be a visual alert to a user of the workstation 10, or a message to the network administrator, or both, or even a trigger for automated action to shut down the network, as desired. At step 846, the program determines whether the variable $V_t$, is increasing above a given rate. If step 846 makes a "yes" determination, the program during step 848, issues a further warning indicating the onset of viral infection. After step 848, the program ends.

A situation in which the second buffer management routine generates a viral infection warning is seen in FIGS. 6A-C. As mentioned previously, during time interval T3, a single Request A (which it will be recalled from the time interval T1 is to contact the mail server), and two Requests C are received. Because the dispatch record 614 for time interval T3 does not contain Request A, the dispatch record adds the identity of host A to the virtual buffer, but not the identify of host C. At the end of the time interval T3 the virtual buffer of the VPMS program therefore contains Request E (stored in the virtual buffer since time interval T2) and Request A. Since only one new request is transmitted per time window in accordance with policy, and since Request E has been in the virtual buffer since time interval T2, whereas Request A has just been added, Request E is deleted from the virtual buffer (a process with may be thought of as "virtual transmission"), so that at the virtual buffer contains only Request A. This indicates that at the start of time interval T4 only one more request has been transmitted than the policy allows. The first Request for connection in time interval T4 is Request B, which illustrates that over the course of the three proceeding time intervals, during which only normal network traffic has been transmitted, connection has only been requested to five different destination hosts. However, Request B is nonetheless defined as new because it is not in the dispatch record 616 for time interval T4. Consequently, the identity of host B is stored in the virtual buffer (this action being illustrated at the same point in the timeline in FIG. 6C). After receipt of request B, the program receives two groups of five virtually simultaneous requests, i.e., F-J, and K-O. Since requests F-J and K-O are also new, their identities are also added to the virtual buffer. Referring specifically to FIG. 6C during time interval T4, the virtual buffer has increased from a size of one, to 12. In accordance with the policy, such an increase is defined as viral infection, since in the present example a buffer size of greater than five generates this alert. Moreover, since the rate of change is positive and rapid (from 1 to 12 in a single time interval), the increase in FIG. 6C during T4 is indicative of the onset of infection. Thus the likelihood is that a substantial number of the requests transmitted during the course of time interval T4 have been virally related.

In the event that a viral warning is generated, various further actions can then be taken, the majority of which are directed toward finding out more about the nature of any possible virus. Specifically the type of information sought may typically include: (1) the destinations to which a virus has been propagated, (2) where applicable, the application program or programs which the virus uses to propagate itself, and (3) the action and behaviour of the virus. The nature of the information which can be obtained directly from the virtual buffer, or which can be deduced therefrom depends to an extent upon the nature of the data stored in the virtual buffer, and the operating system of the host concerned. For example in the case of one preferred embodiment in which the virtual buffer simply copies the socket, including payload, the destination host is recorded in the buffer, and possibly, in the case where the virus copies itself to the socket as the outgoing payload, also the virus. Additionally, where the operating system records an identifier in the socket denoting the application program requesting the socket, and an ability to map this process identifier to the requesting application program after the socket has been closed (remembering that the virtual buffer contains a copy of the socket, while the actual socket is transient since it is used to implement the request to send data and is then deleted), then the application program responsible for requesting data transmission can be identified. The use of the data in a socket is only one way to collect data relating to possible viral infection. Depending upon the extent of the data collected, the reliability of copying of the sockets is likely to vary. For example, if, as referenced above, the fullest data (including e.g. copies of the payload) is to be retained, further copies of the sockets in the virtual buffer (stored for example in a manner which tags them to the copy of the socket in the virtual buffer) are preferably made over time as the contents of the socket change over time. However, because two functional elements within the host can cause a change in the data in a socket (e.g. the writing of outgoing data to a socket by an application program, and removal from the socket of outgoing data by the network stack), maintaining a complete record may nevertheless still be difficult simply from observing the contents of sockets.

In an alternative embodiment, the network stack additionally includes a layer 502 (illustrated in FIG. 5), known as a packet logger, known per se. According to one embodiment, when a viral warning is generated as a result of the virtual buffer size (the virtual buffer of this embodiment still being made of a single copy of a socket), the logger 502 is switched on, and makes copies of outgoing packets. All of the outgoing packets can be copied, or only packets identified by one or more particular destination IP address, the identity of which may, for example, be established from the copies of the sockets in the virtual buffer. By logging packets complete information can be stored relatively easily, since, for example even in the case of large payloads, the individual packets carrying various parts of the payload can easily be aggregated using the SEQ and ACK numbers. Further, if desired, the logger enables incoming packets from designated IP addresses to be logged, to provide valuable information in circumstances, for example, where a virus has a "hand-shake" action with another host (i.e. sends back a packet to its originating host from a destination host) as part of its propagation process (as is the case, for example with the Nimda worm).

The relatively early provision of warning of viral infection is potentially extremely beneficial, since in the case of many viruses the rate at which the viruses can establish infection accelerates over time. For example, in the case of the code red virus, it has been established that over the course of the first 16 hours, 10,000 hosts were infected, but that in the subsequent 8 hours the virus infected a further 340,000 hosts. The early collection of data on viral infection can thus enable action to be taken, either within the hosts within which infection has been detected, and/or within other hosts, which can substantially reduce the extent of subsequent infection.

In the scenario illustrated in connection with FIG. 6, a single outbound request (Request A) to the VPMS, specifying a single destination host, namely the mail server, actually contains a plurality of email messages to different specified addressees. This outbound request can therefore be thought of as a carrier request for a plurality of sub-requests, having the form of putative email messages intended for dispatch from the mail server to a list of addressees specified within the outbound carrier request. Similarly, the mail server can be thought of as acting as a proxy destination host for the ultimate addressees specified in the outbound carrier requests. In this situation, allowing transmission of the data packet constituting the message to the mail server effectively allows the workstation to contact multiple other hosts within the network (i.e. the specified addressees) all of which may be new. The contact occurs even though. In accordance with the routine described in connection with FIG. 7, the outbound carrier request will only count as a single request which may not even be recognised as new if, as may be likely, the mail server is identified in the current dispatch record. In such a situation therefore, if the VPMS operates simply to record in the virtual buffer those new destination hosts to be contacted per time window on the basis only of those destination hosts which are ostensibly identified in the outbound request, the desired monitoring of viral propagation can be circumvented or reduced. The desired monitoring can be reduced or circumvented because a single outbound request specifying the mail server does not necessarily represent only a single email subsequently propagating through the network after processing and forwarding by the mail server.

In a modification of the embodiment thus far described therefore, the VPMS program includes a step of identifying the application program by which an outbound request has been generated. Because certain applications programs are more likely than others to use outbound carrier requests which invoke the use of a proxy (for example the above-mentioned instance of email, or the case of a web browser program) it is possible in advance to specify criteria. The advance criteria can be based on the provenance of an outbound request, identifying those outbound requests likely to be carrier requests. If the packet is generated by one such specified application program, then the VPMS invokes the concerned application protocol to reveal the identities of the destination hosts specified in the sub-requests; here the eventual addressees for whom the email message is intended. Once the identities of the genuine or ultimate addressees have been obtained, there are several options for processing the request. In accordance with one alternative, the identities of the destination hosts specified in the sub-request are regulated in accordance with the same policy which applies to all other requests, and the identities of the destination hosts are matched against the host identities within the dispatch record in the manner previously described in the embodiment described in connection with FIGS. 6-8. Multiple-addressee email messages can be handled as discussed below.

In the case for example of email, it is the norm for the outbound carrier requests be sent to a host that acts as a proxy for the ultimate addressees of the email messages. Consequently a modification enables different versions of VPMS to run simultaneously, (effectively operating in parallel with each other). One version applies to hosts specified in the outbound request (including carrier requests), and another version applies to hosts specified in any sub-requests identified by the email application program. In such a situation, each VPMS operates independently on a category of requests which it is intended to process, using its own dispatch record, and following a policy for outbound requests tailored to the traffic it is set up to control, for example in the manner previously described and illustrated in connection with FIGS. 6 and 7. The two policies can be the same (e.g. a dispatch record of 3 identities, a time window of constant duration $T_n$, and one new host per outbound request/sub-request), or different as desired.

The choices of the length of the time window, the number of identities retained in a dispatch record, and the number of new hosts to be allowed per time window are all dependent upon the likely "normal" performance of the network within which the VPMS is operating, and more particularly, the nature of the network traffic the VPMS is intended to control. Therefore, while a policy such as that illustrated in connection with FIGS. 6 and 7 may be effective in monitoring the propagation of viruses through the network to a rate of infection of one new host per time interval, it may also be susceptible to false warnings caused by non virally-related, or "legitimate" network traffic whose characteristic behaviour differs substantially from the policy the VPMS is performing. To ameliorate this difficulty, it is possible to provide a version of VMPS for each application program from which network traffic emanates, with each VPMS implementing a policy tailored specifically to minimise the chance of false warnings with legitimate network traffic. Alternatively, in accordance with a further preferred embodiment, an individual VPMS is provided for each application protocol which the hosting entity supports, and requests are routed to appropriate VPMS on the basis of the port identified in outgoing requests from application software.

In a further embodiment, the establishment of a record indicative of the normal traffic destination hosts is employed to restrict the propagation of viruses within a network, an example of which is described with reference to FIGS. 9 to 14.

Figure 9:
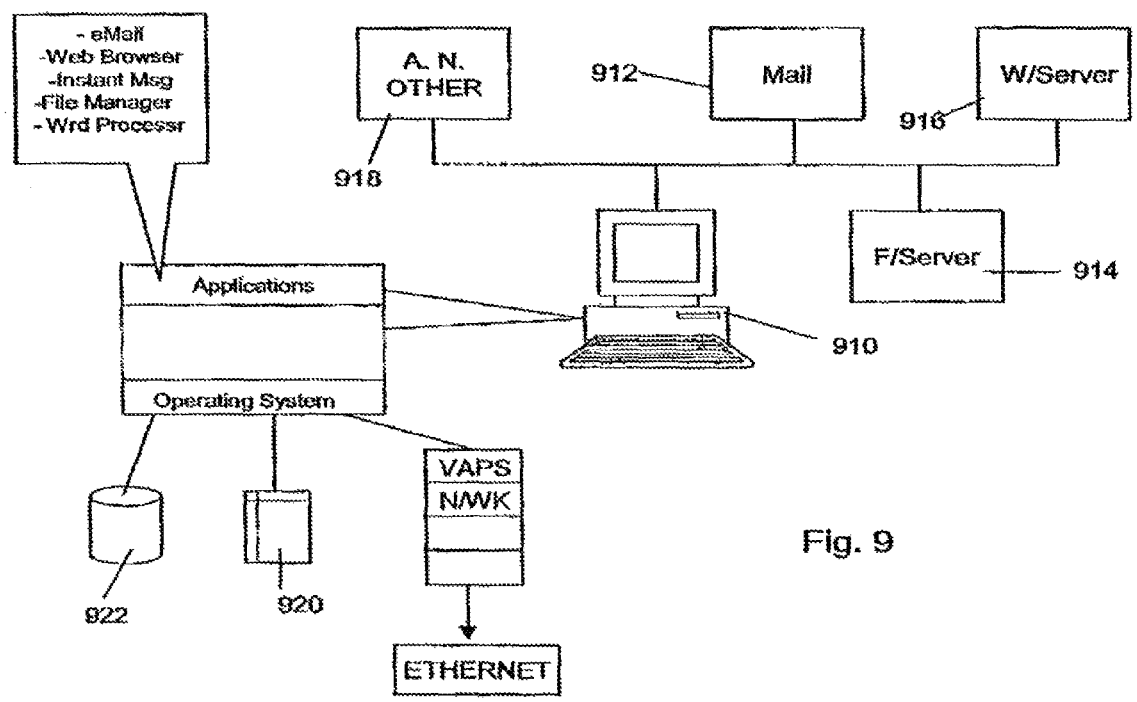
FIG. 9 is a schematic description illustration of an information technology network.

Referring now to FIG. 9, a network, which as previously described, includes a plurality of interconnected hosts. FIG. 9 includes a workstation 910, typically a personal computer, a mail server 912 ("Mail") which handles email communications within the network, a file server 914 ("F/Server") on which shared data within the network is stored, and a web proxy server 916 via which any communication between any host within the intranet and an external host passes. In addition the network includes further hosts, illustrated under the denomination A. N. OTHER, and whose function within the network has no bearing upon the description of FIG. 9.

The workstation 910 runs a plurality of Application software programs concurrently. Workstation 910, as described in connection with FIG. 5, includes an operating system software and usual workstation hardware, such as memory 920, storage 922, and an Ethernet card. Examples of the sort of applications programs which run on the workstation 910 include programs to handle the receipt and dispatch of email from the mail server 912, a web browsing program, a file manager program enabling the organisation and transportation of files, and instant messaging software enabling the dispatch and receipt of ASCII text messages directly to and from peers within the network. In addition, workstation 910 includes a further software program, i.e., Virus Anti-Propagation Software (VAPS), that runs within the network stack, in the same position as the VPMS in FIG. 5, i.e., adjacent the networking software.

As with the VPMS, the VAPS handles all requests to send outbound data from the workstation 910, and operates to restrict the propagation of viruses within the network by limiting the extent to which the workstation can engage in what may be thought of as "unusual" behaviour in contacting other hosts. As mentioned previously in connection with the VPMS, in many networks, normal network traffic (i.e. non-virally related) is characterised by a relatively low rate of connection to hosts within the network which have previously not been contacted. In contrast, virally-related traffic is frequently characterised by a relatively high rate of connection, or attempted connection to previously uncontacted hosts. Broadly speaking, the function of the VAPS is to impede virally-related traffic, while allowing non-virally related traffic to flow with little or no impediment. In the present example the VAPS operates on the basis of a series of time intervals or time windows, which in the present illustrated example are of predetermined and constant length $T_n$. In any given time window $T_n$ the VAPS operates to prevent the host upon which it is running from transmitting requests to more than a predetermined number of "new" hosts, i.e. hosts whose identities differ from those specified in a dispatch record containing identities of destination hosts to whom requests have recently been transmitted. The dispatch record only holds a predetermined number N of destination host identities, so that a destination host specified in a request is classified as new if it is not one of the N destination hosts to which a request has been transmitted. Policy determines the number of new hosts allowed per time window and the value of N. A system administrator typically defines the policy that is preferably formulated to take account of the nature of non virally-related network traffic. In this way, the VAPS operates to limit the speed at which a virus resident on the host can propagate from that host to other hosts within the network.

Referring to FIG. 10A, over the course of the time window T1, various applications programs running on the workstation 910 send requests to the VAPS to connect and send data to destination hosts within the network. The requests are sent to (1) the email application program that requests dispatch of an email message (having multiple addressees) to mail server 912, (Request A), (2) the file management application program that requests dispatch of a file to the file server 914, to save a text document on a shared network drive (Request B), and (3) the web browser program that requests the web proxy server 916 to contact a site external to the subnet within which the workstation 910 is located (Request C). As described above, requests to the VAPS from each of these hosts may be in the form of requests to establish a connection to an identified destination host, or requests for use of connection of all protocols. As previously, the term "request" is to be broadly interpreted to encompass any indication that contact with an identified destination host is required. A request for connection, if allowed, is followed by data typically in the form of data packets transmitted from the relevant application program to the identified destination host.

Figure 10:
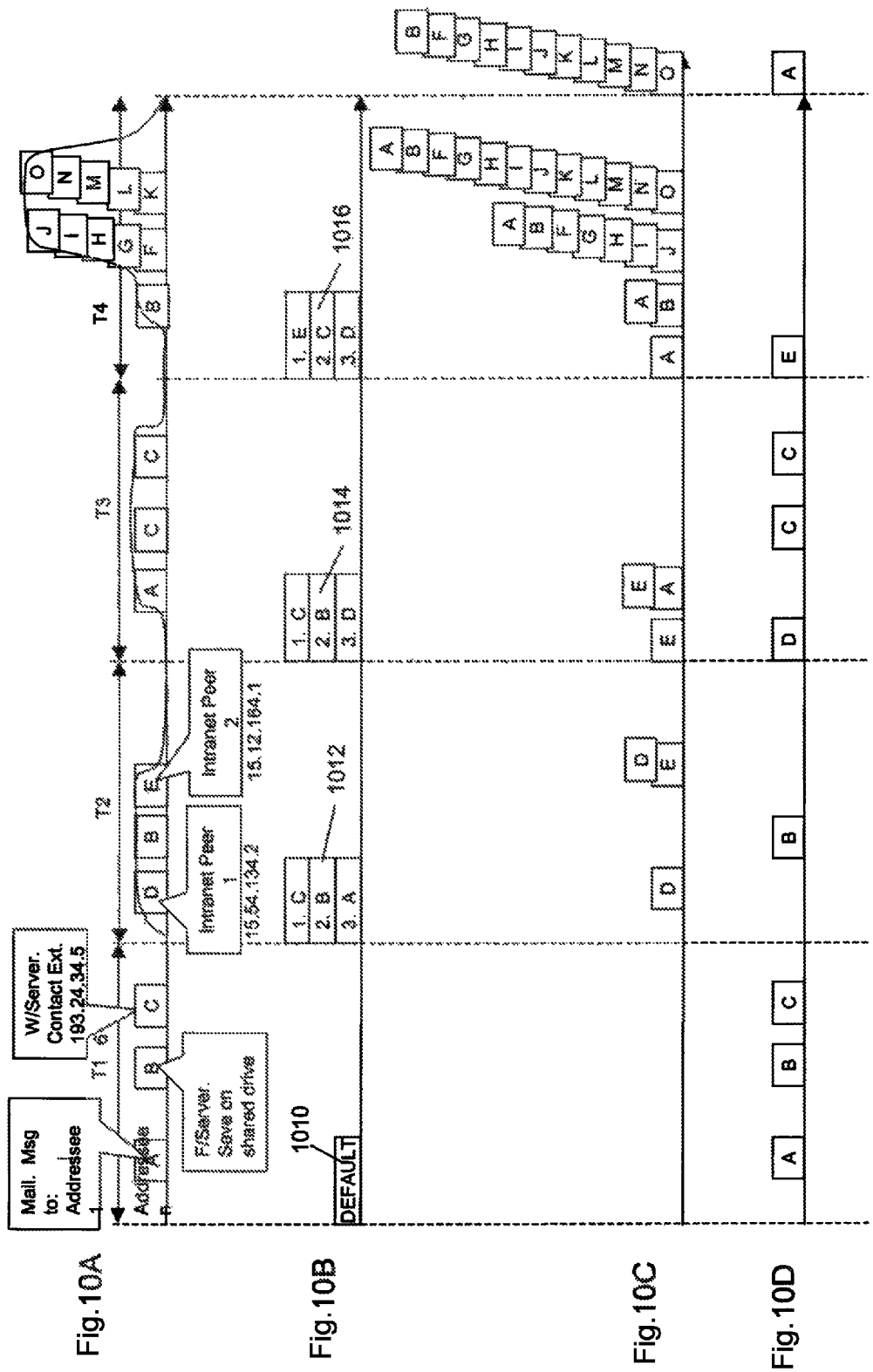
FIGS. 10A-D are schematic illustrations of network traffic from a first host of the network illustrated in FIG. 9 to assist in describing the management of such network traffic.
Figure 11:
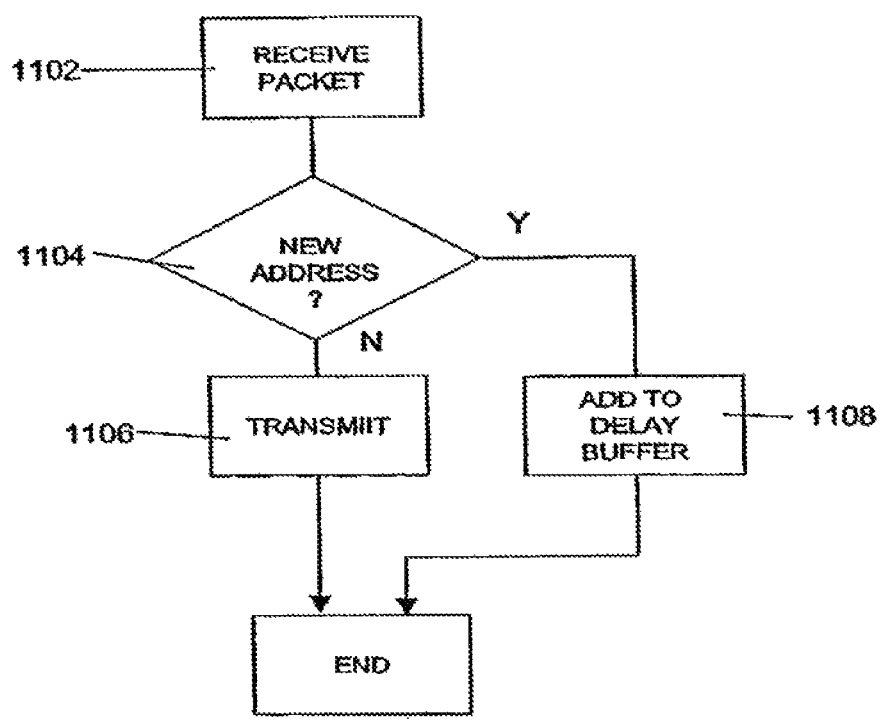
FIG. 11 is a flow chart illustrating operation of an aspect of a method according to one embodiment.

These requests are processed in accordance with an incoming request routine, forming part of the VAPS; FIG. 11 is a flow diagram of the VAPS program. The various steps that take place during the course of this routine are now described in more detail with reference to the graphical representations of FIGS. 10A-D in combination with the flowchart of FIG. 11. Subsequent to their generation by their respective applications programs, each of the outbound requests, hereinafter abbreviated as Requests A, B, C, passes from the respective application by which it was generated, to the VAPS in the network stack, whereupon the process within the VAPS which processes the requests is initiated in step 1102. Upon passing into the VAPS, the identity of the requested destination host specified in each packet is matched with a dispatch record which stores the identities of a predetermined number N (which in this example is 3) of the destination hosts most recently contacted in the previous time window (and which are shown for each time window in FIG. 10B). Matching the identifies enables VAPS to determine whether the requested destination host is a new host, as represented at step 1104. The example of FIG. 10 somewhat artificially illustrates the principles underlying embodiments of the present invention. In FIG. 10 the time interval T1 is the first time interval after start-up of the workstation 910. During interval T1 VAPS matches the destination host identities for each of the Requests A-C against identities held in a "default" dispatch record 1010. In the illustrated example, record 1010 is simply a record of the three hosts most frequently contacted during the lifetime of workstation 910. In the present example the three most frequently contacted hosts, and therefore the three identities retained in the default dispatch record are those of the mail server 912 (Request A), the file server 914 (Request B) and the web proxy server 916 (Request C). Since each of the three outbound requests from workstation 910 during the time period T1 identify a host destination matching one of the three host identities in the default dispatch record, and therefore none of the Requests A, B or C is seeking to establish contact with a new destination host, the VAPS transmits each request at step 1106. In the example of FIG. 10, this means that VAPS allows a connection to be established from workstation 910 to each of hosts 912, 914 and 916. Transmission of the request during period T1 is illustrated schematically on the graph of FIG. 10D, which has the same time scale as FIGS. 10A-C, meaning that the temporal relationship between events illustrated in each of these graphs can be readily appreciated.

During the course of the second time interval T2, workstation 910 generates three further outbound requests identifying host destinations "Intranet Peer 1" (Request D), Request B (which as indicated above corresponds to the File Server 914) and "Intranet Peer 2" (Request E) are received by the VAPS from: an instant messaging application program (in the case of Requests D and E), and the word processing application, in the case of Request B. As in the previous time window, as each request passes to the VAPS, and as previously indicated in step 1104, the identity of the host destination in the request is matched with the identities present in the dispatch record 1012. The dispatch record however is now a genuine record of the identities of the three hosts to whom requests have been transmitted most recently in accordance with the policy during the previous time window T1 (although coincidentally this is identical to the default dispatch record). Upon receipt of Request D, the VAPS establishes at step 1014 that the identity of Internal Peer 1 is not in the dispatch record, i.e. that it is a new destination host, whereupon VAPS denies the request, and stores the request in a delay buffer of VAPS, step 1108. The delay buffer is effectively a queue of requests which VAPS has not allowed to be transmitted, and the contents of the delay buffer are illustrated schematically in FIG. 10C (the delay buffer is shown in FIG. 10C on each occasion that its contents change). It therefore follows that for each request illustrated in FIG. 10A, there is either a corresponding change in the delay buffer (illustrated in FIG. 10C) when the request is denied or transmission of the request (illustrated in FIG. 10D) when the request is transmitted (possibly accompanied by a change in the despatch record). Request B is processed as previously indicated. Since Request B is present in the dispatch record, this Request B is transmitted, which can be seen in FIG. 10D, while Request E, in a similar manner to that of the instance of Request D, is denied and added to the delay buffer, as illustrated in FIG. 10C for period T2.

Thus, at the end of the time period T2, no requests to new destination hosts have been transmitted, and the delay buffer contains two entries. At this juncture (i.e. at end of time period T2), the policy which the VAPS is designed to perform comes into play. In the present example, the policy is that a single new host can be contacted per time interval.

This element of the policy is performed by VAPS including a first buffer management program, which is illustrated schematically in flowchart form in FIG. 12A. The program of FIG. 12A begins at step 1202 with the advent of a clock timeout, that is, that the clock (not shown) which defines the time intervals $T_n$ has completed another time period. At step 1203 the program determines whether there are any entries in the delay buffer (identifying new requests), and it does this using a variable known as LogNo, which is the number of entries in the delay buffer at any moment. If LogNo is not greater than 1 (step 1204). i.e. there are no entries in the delay buffer, the program ends at step 1206. In the present illustrated example however during time interval T2 two requests, D and E have occurred, causing two corresponding entries to accumulate in the buffer. Therefore the program proceeds to step 1208, during which VAPS allows the first request RQ1 (i.e. the one which has been in the buffer for the longest time) to be transmitted. Optionally, at step 1210, the program searches the buffer for other entries that identify requests specifying the same destination host and transmits any such requests. The logic behind this is that, if there is a virus in the first transmitted request RQ1, further copies of the virus are not likely to be deleterious to any great extent. Alternatively, step 1210 can be omitted. The program advances to step 1212 during which VAPS updates the dispatch record so that the dispatch record accurately reflects the identity of the three most recently contacted hosts. FIG. 10B indicates the dispatch record contains the identities D, C, B, which are the three most recently transmitted requests, as indicated in FIG. 10D in accordance with policy. The final step in the first buffer management program is updating the value of the variable LogNo that denotes the size of the buffer. In the example of FIG. 10 the buffer size is one (i.e. the single request E), following the transmission of the Request D. Thus, at the end of the time interval T2 the buffer stores a record of requests occurring outside the bounds of the policy.

The buffer size plays an important role in performance by the VAPS of another aspect of the policy. Buffer size enables VAPS to detect a state of viral infection in terms of the size of the buffer, and the stage of any such viral infection by the rate of change of the buffer size. This follows from the generally different behaviour of virally-related and non virally-related network traffic, because non virally-related or "legitimate" network traffic usually involves contacting only a relatively small number of new destination hosts. In contrast, viruses tend to propagate by transmission to as many disparate destination hosts as possible. Consequently, an instance of a large number of requests to contact a new destination host is typically indicative of viral infection. Given that the buffer is effectively a queue of new requests waiting to be transmitted, the size of the buffer is one indication of whether there is viral infection, since a large buffer size indicates a large number of requests to contact a new host within a short space of time. In addition, increases in buffer size indicate the onset of viral infection, whereas a steadily declining buffer size, although large, indicate of the end of a viral infection.

A second buffer management program that VAPS stores (illustrated in FIG. 12B) performs this rate of change part of the policy. The program of FIG. 12B is triggered at step 1240 by the occurrence of an update of the value of LogNo (this being step 1214 in the first buffer management program of FIG. 12A). The program of FIG. 12B can also be triggered by step 1203, or step 1108 in FIG. 11. From step 240, the program of FIG. 12B advances to step 1242, during which the program determines whether the size of the buffer is greater than a quantity $V_i$, which the policy has determined represents viral infection. If step 1242 produces a yes result, the program generates a virus alert, step 1244. The virus alert of step 1244 can simply be a visual alert to a user of the workstation 910, or a message to the network administrator, or both, or a trigger for automated action to shut the network down, as desired. The program then advances to step 1246, during which the routine program determines whether the variable $V_i$, is increasing above a given rate. If the determination of step 1246 is yes, VAPS issues a further warning indicating the onset of viral infection at step 1248, following which the routine ends.

A situation in which the second buffer management routine generates a viral infection warning can be seen by considering time intervals T3 and T4 of FIGS. 10A-D. During time interval T3, VAPS of workstation 910 receives a single Request A (which it will be recalled from the time interval T1 is to contact the mail server 912), and two Requests C. Because the dispatch record 1014 at the beginning of time interval T3 does not contain Request A, VAPS (1) denies Request A and sends it to the delay buffer, and (2) transmits the two Requests C. At the end of the time interval T3 the buffer of VAPS therefore contains Request E (stored in the delay buffer since time interval T2) and Request A. In accordance with the policy, the first buffer management routine transmits Request E at the end of the time interval T3, meaning that at the start of time interval T4 the buffer contains only Request A. The first request for connection in time interval T4 is Request B (the File Server). Hence over the course of three time intervals, during which only normal network traffic has been transmitted, connection has only been requested to five different destination hosts. However, Request B is nonetheless defined as new because it is not in the dispatch record 1016 for the beginning of time interval T4. VAPS therefore sends Request B to its buffer (this action being illustrated at the same point in the timeline in FIG. 10C). After VAPS receives receipt of request B during interval T4, VAPS receives, two groups of five virtually simultaneous requests: F-J, and K-O. Since Requests F-J and K-O are also new, VAPS adds them to the buffer upon receipt and processing. Referring specifically to FIG. 10C during time interval T4, it can readily be seen that the buffer has increased from a size of one, to 12. In accordance with the policy, the new buffer size is defined as viral infection, since in the present example a buffer size of greater than five generates this alert. Moreover, the rate of change of buffer size is positive and rapid (from 1 to 12 in a single time interval), to indicate of the onset of infection.

In the example described above the VAPS has been configured to delay outbound requests. This has the advantage of being able to use the delay buffer to provide useful information. In addition, delaying outbound requests for connection is generally regarded as being compatible with the operation of many computer systems and networks. However, the VAPS may be configured to operate in a number of ways. For example, in accordance with an alternative embodiment, where the computer system permits, the VAPS may, having denied the request for connection, simply return a suitable error message to the dispatching application program by which the packet was generated, and then delete the packet. In accordance with this embodiment the dispatching application program must (if the packet is eventually to be successfully dispatched) then resend the packet. In this alternative embodiment, the policy relating to the number of new requests which are to be transmitted per time interval can be implemented by initialising a variable corresponding to the number of new requests received in a particular time interval, and incrementing this variable whenever a new request is received. Requests can then either be instantaneously transmitted (in the same manner as requests already in the dispatch record) or denied and deleted on the basis of whether the variable indicative of the number of new requests per time interval has reached a maximum set in accordance with the policy (i.e. in the previous example, one).

In the present example, the dispatch record lists transmitted requests in historical order, with the ordinal numbering signifying the temporal order in which the hosts were contacted, i.e. No. 1 indicating the host most recently contacted, and No. 3 indicating the host contacted the longest time previously (i.e., "first in first out)". This is not essential, and it is equally possible to list the transmitted requests in another order, such as "first in last out" for example, or "least recently used".

In a similar way to that described in connection with the first embodiment, a single outbound request (Request A) to the VAPS, specifying a single destination host, namely the mail server, actually contains a plurality of email messages to different specified addressees. As previously, in such a situation therefore, if the VAPS operates simply to restrict the number of new destination hosts to be contacted per time window on the basis of only those destination hosts which are ostensibly identified in the outbound request, the desired restrictive effect on virus propagation can be circumvented or reduced, because a single outbound request specifying the mail server does not necessarily represent only a single email subsequently propagating through the network after processing and forwarding by the mail server.

As with the first embodiment, in a modification of the second embodiment thus far described, the VAPS includes within its routine a step of identifying the application program which has generated an outbound request. Because certain applications programs are more likely than others to use outbound carrier requests which invoke the use of a proxy (for example the above-mentioned instance of email, or the case of a web browser program) it is possible in advance to specify criteria, based on the provenance of an outbound request, identifying those outbound requests likely to be carrier requests. If the packet is generated by one such specified application program, then the VAPS invokes the use of the concerned application program to reveal the identities of the destination hosts specified in the sub-requests; here the eventual addressees for whom the email message is intended. Once the identities of the genuine or ultimate addressees have been obtained, there are several options for processing the request. In accordance with one alternative the identities of the destination hosts specified in the sub-request can be regulated in accordance with the same policy which applies to all other requests for connections, and they can be matched against the host identities within the dispatch record in the manner previously described in the embodiment of FIG. 11. In the event that the message contains more new addressees than the policy which the VAPS is implementing will allow to be transmitted in a single time window, then what may be thought of as the surplus addressees can, depending upon the operation of the email program, either be purged from the list, and the message transmitted (such surplus messages can alternatively be dealt with in a different manner, which may also be specified in accordance with the policy), or preferably they are stored in a delay buffer as described in connection with FIGS. 10 and 11.

Since in the case for example of email, the use of outbound carrier requests to a host acting as a proxy for the ultimate addressees of the email messages is the norm, it is, in a modification, possible for different versions of VAPS to run simultaneously, effectively operating in parallel with each other; one VAPS version applies to hosts specified in the outbound request (including carrier requests), and another which applies to hosts specified in any sub-requests identified by the email application program. In such a situation, each VAPS operates independently, using its own dispatch record, and performing a policy for outbound requests tailored to the traffic it is set up to control, for example in the manner previously described and illustrated in connection with FIGS. 10 and 11. The two policies can be the same (e.g. a dispatch record of three identities, a time window of constant duration $T_n$, and one new host per outbound request/sub-request), or different as desired.

The choice of the length of the time window, the number of identities retained in a dispatch record, and the number of new hosts to be allowed per time window all depend upon the likely "normal" performance of the network within which the VAPS is operating, and more particularly, the nature of the network traffic the VAPS is intended to control. Therefore, while a policy such as that illustrated in connection with FIGS. 10 and 11 is effective in limiting the propagation of viruses through the network to a rate of infection of one new host per time interval, it may also be susceptible to interfering with non virally-related, or "legitimate" network traffic whose characteristic behaviour differs substantially from the policy the VAPS is performing. To ameliorate this difficulty, it is possible to provide a version of VAPS for each application program from which network traffic emanates, with each VAPS performing a policy tailored specifically to minimise the level of impediment to legitimate network traffic.

FIG. 13A is a plot of activity (i.e. the number of requests processed by the VAPS) against time for the example of FIG. 10A. From graph of FIG. 13A it can be readily appreciated that prior to the viral infection signified by the rapid increase in the number of requests during the time interval T4, only a relatively low number of requests are processed per time interval, and that therefore it is possible to use the VAPS to perform a policy of preventing connection to more than one new host per time interval without impeding legitimate network traffic to any significant extent. Consider however an excerpt of a graph illustrating legitimate traffic flow in FIG. 13B, where there are significant levels of activity, interspersed by a much shorter period of time during which there is no activity at all. Applying the rather simple policy of permitting connection to one new host per time interval, where all time intervals are of the same duration would significantly impede the flow of the legitimate network traffic illustrated in FIG. 13B. Ideally therefore, an alternative policy is required which accounts for the nature of this legitimate traffic flow.

An example of such a policy is illustrated in FIG. 13C, where two sorts of time intervals are illustrated; $S_l$, a relatively long time interval, and $S_s$, a relatively short time interval. From FIG. 13C it can be seen that when placed together alternately, the time intervals $S_l$ correspond to the time interval in the graph of the traffic flow from FIG. 13B where there is a flow of traffic, and the time interval $S_s$ where there is no traffic flow to Interval $S_s$ is between two long time intervals. By segmenting time for a VAPS using these two time intervals therefore, it is possible to construct a policy which matches closely the legitimate behaviour illustrated in FIG. 13B, but still provides an impediment to the propagation of viruses. Such a policy for the VAPS is provided using the variable LogNo, which as explained above corresponds to the number of requests present in the delay buffer at the end of any given time interval. In the present example it is desirable to provide a policy which does not impede the free flow of the legitimate traffic pattern illustrated in FIG. 13C.

Figure 14:
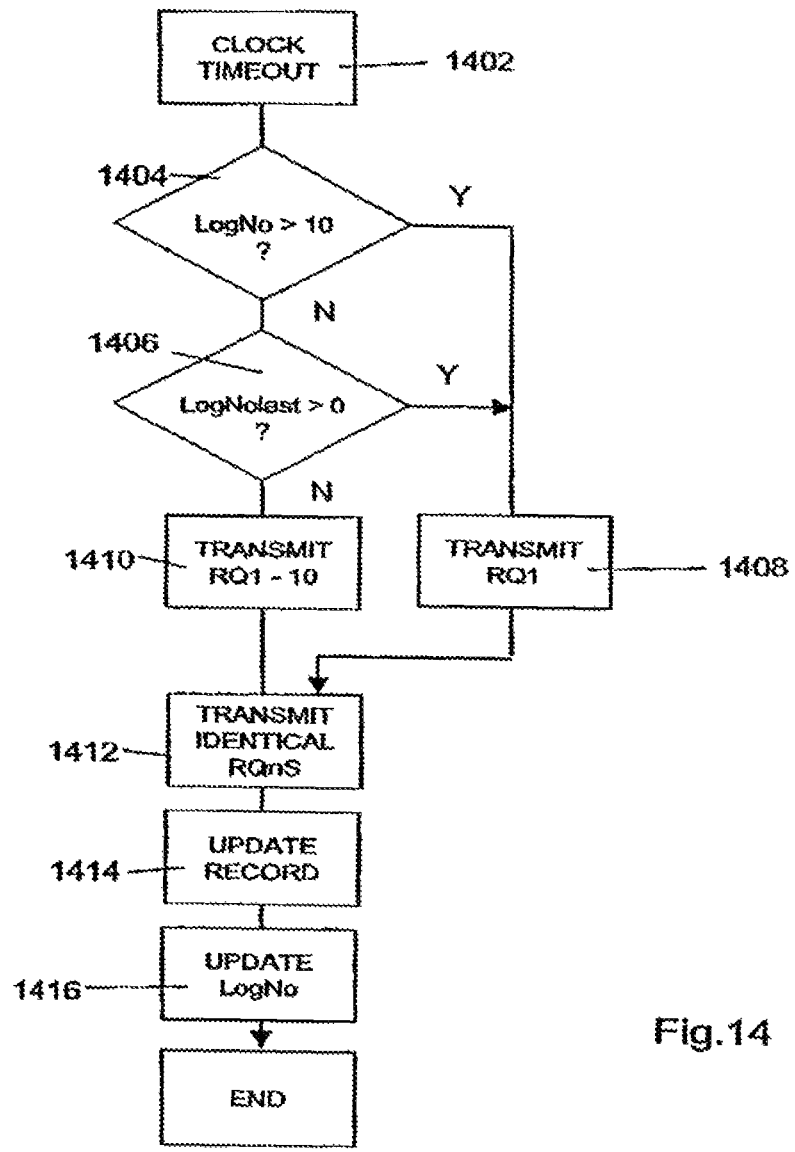
FIG. 14 is a flowchart of steps for performing the method associated with FIGS. 13A-C.

The flow diagram of FIG. 14 is a modified first buffer management program that VAPS performs based on FIG. 13. Following a clock timeout at step 1402, the program determines at step 1404 whether the LogNo is greater than a predetermined number, in this instance 10. The number 10 is chosen, in conjunction with the number of request identities held in the dispatch record. Ten is equal or slightly larger than the number of requests typically received during a "long" time interval $S_l$. If LogNo is greater than 10, then the programs defaults to step 1408, where the program transmits only the first request in the delay buffer, and then proceeds to step 1412 where VAPS permits transmission of identical requests. The program then advances to step 1414 during which VAPS updates the record, then to step 1416 during which VAPS updates the value of LogNo.

If step 1404 determines LogNo is less than 10. i.e. less than 10 new requests have been received during the course of the time interval under consideration, then the program proceeds to step 1406, during which VAPS determines whether a further variable LogNoLast, equal to the number of new requests received during the previous time interval, is greater than zero. If the determination of step 1406 is yes, the program defaults once again to step 1408 where only a single request is transmitted from the delay buffer. If the determination of step 1406 is no, i.e., no new requests were received during the previous time interval, then the routine acts to transmit, at step 1410, requests 1-10 from the delay buffer, followed by previously described steps 1412 to 1416. Thus, when VAPS receives 10 or less new requests during a time interval, and no new requests were received during the previous time interval, VAPS transmits all 10 requests. This mimics the legitimate activity during a "long" time interval $S_l$, where the activity level is relatively high, but in the previous short time interval activity was zero. Correspondingly, in any time window where there were more than 10 new requests (i.e. a greater level of activity than usual in a longer time interval) or where, in the previous time window there were more than zero new requests (which is the pattern of legitimate traffic flow illustrated in FIG. 13B), the routine defaults to what may be thought of as the "standard" policy of one new request per time interval. Thus VAPS throttles activity differing from usual legitimate activity, and which is likely to be virally-related. Hence, the modified VAPS program performs a policy which conforms generally to the behaviour pattern illustrated in FIG. 13C.

This modified policy has been achieved using two time intervals of different lengths, and a modified version of the buffer management routine, effectively to augment the number of destination hosts which, ultimately (i.e. in this example, at the end of time intervals $S_j$) end up as not being regarded as new. It is however possible to provide policies involving varying other parameters, such as the number of destination host identities retained in the dispatch record, thereby increasing for any given time interval, the number of destination hosts which will not be regarded as being new, and consequently transmitting a greater number of destination hosts per time interval (or in the case of FIGS. 13C and 14, per alternate time interval). This would be appropriate in circumstances where the legitimate traffic flow of FIG. 13B is characterised by contact with 10 destination hosts whose identities are the same, or similar each time. To achieve this for the traffic flow of FIG. 13B, two dispatch records for the destination hosts are used; one for the time intervals $S_l$, containing 10 destination host identities, and the other for the time intervals $S_s$, containing no destination host identities, with the two dispatch records being used alternately. However, as indicated above, where the legitimate traffic flow is characterised by contact with a predetermined number (in this example 10) different destination hosts during each time interval $S_l$, this modification would not be appropriate because it would still impede this legitimate traffic flow.

Yet a further and more refined version of this policy employs a modified version of the program of FIG. 11. In the modified version the further variables NreqNo, and NreqNolast, denoting the number of new requests in a particular time interval, and the number of new requests in the preceding time interval (and thus the real time equivalents to LogNo and LogNolast) are used to transmit new requests contemporaneously. In the exemplary modified version, provision is made for contact with 10 new destination hosts per time interval $S_l$, provided that the two criteria of steps 1404 and 1406 are satisfied, i.e. that ReqNo is less than 10, AND ReqNolast was equal to zero. This modification has the advantage of allowing requests to pass immediately, which in cases where legitimate traffic levels are high, prevents undue impediment to legitimate traffic flow. In this modified version new requests which are not transmitted are once again stored in the delay buffer, which as previously, inter alia, enables an indication of viral infection from the value of the LogNo variable.

The operation of the VAPS has been illustrated herein on a single workstation within a network. However, in order to be most advantageous it is desirably provided on a plurality of hosts within the network; the greater the number of hosts upon which VAPS is provided results in a greater limit on the ability of viruses to propagate through the network.

The use of a number of different VAPS running concurrently, with one VAPS per application program is preferred, since it enables the performance of different policies for different application programs and thus policies designed to minimise impediment to legitimate traffic flow, while simultaneously providing protection against viral propagation via the appropriated use of application programs. Other arrangements are possible, such as: a single VAPS providing a single policy for all applications programs; a plurality of VAPS, some of which deal with traffic from a specified application program, and some of which deal with traffic to a particular destination port (which can be thought of generally as dealing with traffic using a particular communications protocol); or a plurality of VAPS may be provided with each one dealing with traffic for a particular destination port.

The detection of viral activity can be determined in a number of manners. For instance, it has been described above that a virus is detected if the size of the delay buffer exceeds a predetermined value. However, it is possible for viruses to operate in a manner which maintains a delay buffer at a large value, just less than the predetermined threshold used to indicate viral activity. Such viruses can be said to be "riding the threshold". Consequently, various other techniques can be used to detect viral activity, either as an alternative to the predetermined threshold size of the delay buffer, or in combination with this or other techniques.

For instance, a transient increase in the size of the delay buffer can provide an indication of viral activity. In other words, increases in the size of the delay buffer increase greater than a predetermined threshold (i.e., the amount by which the size of the delay buffer increases in a predetermined time), can indicate viral infection.

This can be measured as an instantaneous value, or over a single time interval, or over a plurality of time intervals.

Alternatively, a virus can be regarded as active if there is a constant non-zero value in the size of the delay buffer for a predetermined time e.g. for a predetermined number of time intervals. For instance, a virus could be regarded as active if the size of the delay buffer is greater than a predetermined value for more than a predetermined number of time intervals. This could correspond to a virus attempting to beat the virus detection or protection technique, by riding the threshold. The virus may be providing a large number of requests to new hosts. However, if the virus is attempting to maintain the number of requests less than the absolute value for the predetermined number of time intervals an alarm for indicating viral activity is activated.

An additional parameter can be introduced into the above embodiments, to take into account situations in which no traffic has passed through the VPMS or the VAPS. This parameter is termed "slack". In some circumstances, a host does not send requests for a relatively long time, and then suddenly wishes to send a number of requests simultaneously. This could, for instance, correspond to a user returning from a lunch break, and then wanting to send a number of emails and/or browse a number of web sites on the Internet. The slack parameter is suitable for accommodating such a situation and operates to augment the number of new requests which might be transmitted and yet not stored in a virtual buffer (the case of VPMS). Otherwise, if no traffic has passed through the monitoring system for a relatively long period of time, then such a burst of traffic might be regarded as indicating the presence of a virus by the VPMS. Alternatively, the VAPS might act to delay the new connection.

The value of the slack parameter is based on the number of time periods in which no new traffic passes through the VAPS or VPMS. There are two alternative, preferred ways of using the slack parameter. The first slack procedure corresponds to no new requests being made to the VAPS or VPMS; the second corresponds to no new requests being despatched from the VAPS or VPMS.

In the first slack parameter procedure the slack is incremented for every predetermined time interval or period in which there are no new requests (i.e. no requests to a host not on the despatch record). In the second slack procedure, the slack is incremented for every predetermined time interval or period during which the delay queue (e.g. the buffer) is empty. In both procedures, the slack value is incremented up to some predetermined maximum value ("maxslack").

The value of the slack parameter is decremented by each new request that VAPS allows, down to a minimum value (e.g. minslack=0). If the slack value is at the minimum, then any further new requests are treated in the normal manner (e.g. as potentially indicative of viral infection, or delayed).

The slack parameter is thus very useful in dealing with bursty traffic that is on average below the normal operating rate of the network, but is transiently above the limit. Consequently, the slack parameter helps to prevent VAPS or VPMS from interfering with normal operational behaviour of the network.

Instead of measuring the time period since the last new request, preferably slack is only incremented every time a time interval expires and the delay buffer is empty.

A similar parameter, analogous to the above-mentioned slack parameter, can be used for methods associated with emails e.g. for restricting propagation of viruses via emails.

Both VAPS and VPMS operate on the assumption that normal network traffic (e.g. emails) occurs at a low rate compared to network traffic instigated by a virus. For emails sent to single recipients this is largely true. It takes time to compose an email, and emails sent quickly tend to be to addresses that have been emailed recently. For instance, typical parameter values are a host record size of 4, a clock time out Tn of 1 minute, maxslack of 1.

Multiple recipient emails appear to the VAPS or VPMS as viruses, as they are effectively a large number of messages sent very quickly. Further, the addresses used on multiple recipient emails are often fairly random, and thus are unlikely to fall within the record of normal destinations. To achieve minimal impact on normal traffic would need a large host record, and a large value for the slack parameter. Preferably, the record and the slack are small, otherwise the virus is able to send messages to many recipients before being limited.

As a solution to this, in addition to the previously described VAPSN/VPMS for single recipient emails, a different process is used for multiple recipient emails. The different process uses a new parameter, termed herein "mSLACK," which has a value between zero and "maxMSLACK" (i.e., the maximum value of "mSLACK"). The value of mSLACK is incremented for every time period or interval that the user does not send any multiple emails, up to the maximum value of maxMSLACK. The value of mSlack can be incremented by either of the methods described previously. The value of mSLACK is reset (e.g. to zero) after every multiple email has been sent. A typical value for maxMSLACK is 25. A typical clock time out period (Tn) to utilise is one minute, which can be the same value as the time period used for sending emails to single recipients.

A VAPS or VPMS for emails can be used on a host machine that sends the emails, or more preferably it is provided on an email server (for instance either a Microsoft Exchange Server or an SMTP server), or on an input to the server. Preferably, a VAPS or VPMS is provided for each email client e.g. per host machine or per email user.

Normally, an email client sends a single multiple recipient email to a server. The server then generates a separate email (a copy of the multiple recipient email) per recipient within the address field of the multiple recipient email, and then sends these copies to each recipient.

If a VAPS or VPMS utilising the parameter mSLACK is implemented on a host machine (e.g. the machine with the email client), it is preferable that the email client (or the VAPS or VPMS) is arranged to split every multiple recipient message into a multiple number of single recipient emails.

Figure 15:
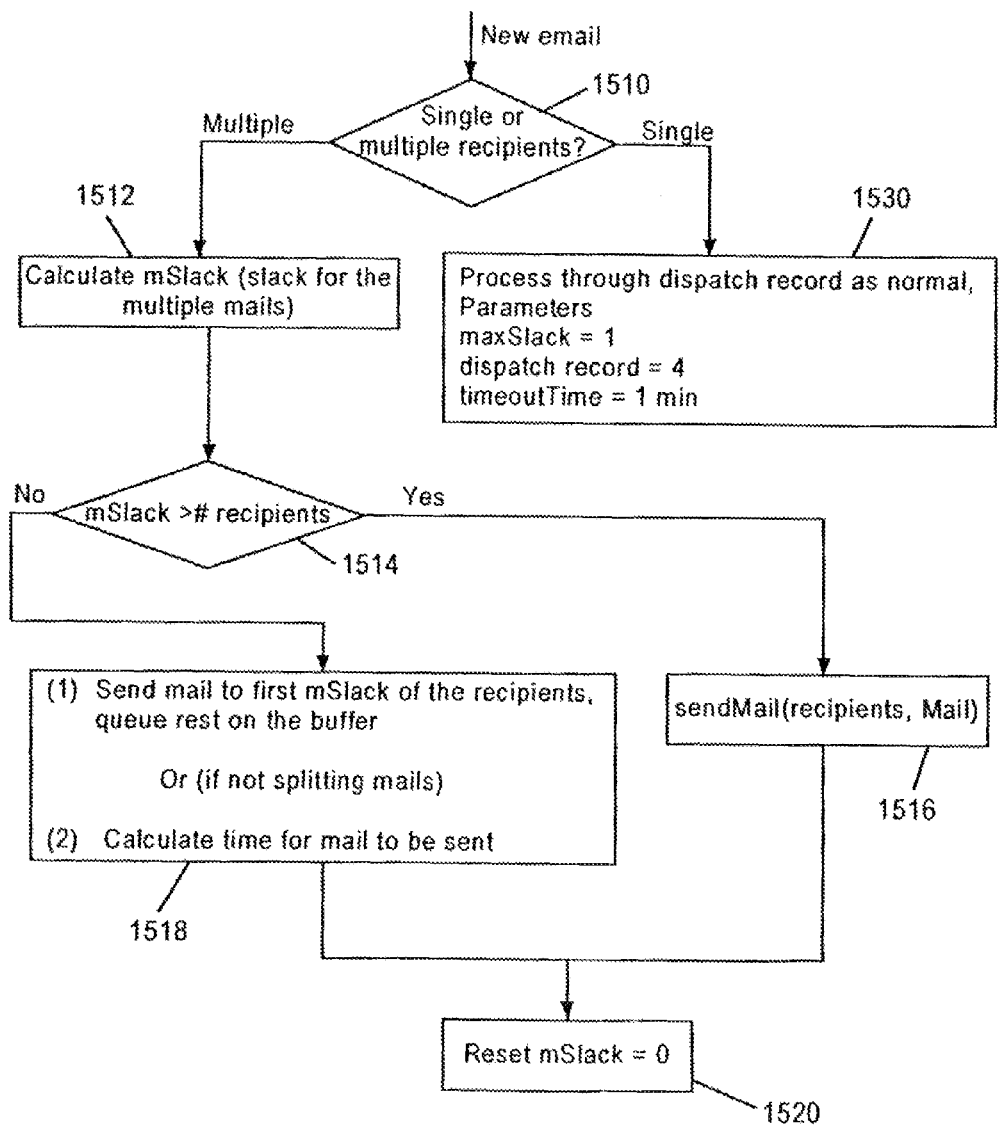
FIG. 15 is a flow chart of steps of a further embodiment.

FIG. 15 is a flow chart illustrating a VAPS program for email, and utilising the parameter mSLACK.

Once an email has been generated by a user, a VAPS determines if the email is addressed to be sent to a single recipient, or to multiple recipients (step 1510). If the email is to be sent to a single recipient, then the email is processed in the normal manner (step 1530) with a check made as to whether the intended recipient is a recipient within the dispatch record.

If VAPS determines during step 1510 that the email is to be sent to multiple recipients, then VAPS determines the value of the parameter mSLACK (step 1512). There are two alternative, preferred procedures to obtain the mSLACK parameter. The first procedure corresponds to no new requests being made to the VAPS or VPMS to send a multiple recipient e-mail; the second corresponds to no new requests being despatched from the VAPS or VPMS.

In the first procedure the mSLACK is incremented for every predetermined time interval or period in which there are no new requests (i.e. no requests to send a multiple recipient e-mail). In the second procedure, the mSLACK variable is incremented for every predetermined time interval or period in which a delay queue (such as provided by the buffer) is empty.

VAPS then checks to determine whether or not the value of mSLACK is greater than or equal to the number of recipients of the multiple email (step 1514). If the value of mSLACK is greater than or equal to the number of recipients, then the multiple recipient email is sent to all the recipients (step 1516), and the value of mSLACK reset to zero (step 1520).

Option 1: However, if the value of mSLACK is less than the number of recipients, then a delay mechanism (step 1518) is utilised. If the multiple recipient email is being processed so as to be sent out as a multiple number of single recipient emails, then the first mSLACK of these single recipient emails is dispatched, with the remainder of the single recipient emails generated being queued in the VAPS buffer; the emails in the VAPS buffer are considered to be in a delay queue. These emails are then taken off the delay queue or buffer at a predetermined rate (i.e. one per time period). It is envisaged that the single recipient and the multiple recipient mails can share the same delay queue.

Option 2: Alternatively, if the multiple recipient email is not being split into a multiple number of single recipient emails at this point (e.g. if the VAPS is a program in a host machine that sends a single multiple recipient email to an email server), then the multiple recipient email is delayed. In other words, the email has a send time placed on it that is equivalent to the time that the last email would have been sent if option 1 had been utilised.

By utilising such a parameter, small dispatch records can be utilised without unduly delaying multiple recipient emails.

Typically, in all email arrangements, it will be desirable to provide two thresholds on the buffer to trigger other activities. When the buffer size reaches a predetermined first threshold, VAPS sends a warning to the user of the email client. This warning may include an indication that the number of emails sent is high, that the number of emails sent is indicative of viral activity, and that the outgoing emails are stopped if similar activity persists.

If the size of the buffer exceeds the second, high threshold, then outgoing emails from the host are stopped. Preferably, incoming emails are still permitted. This allows the user to be kept informed of events, and to be given instructions on how to remove the email block.

Outgoing messages can be stopped by placing a stop on messages being sent from the buffer. The buffer would subsequently increase in size, as more requests to send emails are made. This has the disadvantage of taking up memory, but would potentially allow the recovery of valid messages at a later stage.

Alternatively, if the technique is being implemented within an email server, the server could simply refuse any further connections from that user (e.g. that host machine or email client) that attempt to send email. Further, the server could place a stop on sending any locally stored messages that originated from that user. In such a situation, it is likely that the host machine will store the message (e.g. the messages will be stored in the local out box).

It will be appreciated from the above description that the performance of VPMS or VAPS is dependent upon a number of parameters, which exist both as variables and thresholds. Altering such parameters varies the sensitivity of the virus detection or virus, the severity with which propagation is throttled. For instance, if the record used to indicate identities indicative of hosts to which data has been sent by the first host decreases in size, then the throttling or virus detection method will be made severe i.e. data passage will be more limited and/or more warnings indicative of viral activity are likely to occur.

However, the present inventors have appreciated that in some circumstances, it can be advisable to vary the parameters.

For instance, the parameters can be varied with the time of day so the parameters are systematically varied by predetermined amounts over the course of a day. Such a technique could be used, for instance, to provide more severe throttling or viral detection outside of the working hours (when normal network traffic is likely to be lower).

If desired, an extra parameter can be introduced corresponding to a perceived threat level. This extra parameter can be introduced by a system administrator, or alternatively might be performed by automatic detection of the rest of the network e.g. when the rest of the network is believed to be under virus attack, then the threat level parameter is increased. A high threat level parameter corresponds to the parameters being adjusted to provide more severe throttling or viral detection on a host computer.

It is conceivable that some viruses might attempt to spread whilst remaining undetected or relatively un-impeded by operating at levels (i.e. sending new requests) just less than that would be detectable or throttled. In order to fool such viral attacks that attempt to "ride the threshold", the parameters can be changed randomly by small amounts. Alternatively, the parameters can be pulsed between parameters that provide a severe operating regime and those that provide a more relaxed operating regime.

Regardless of whether or not the parameters are varied as a function time, it is desirable to be able to determine parameters that effectively detect or limit the propagation of viruses within a network. Such a determination can be performed automatically, by providing a set of data corresponding to normal network traffic (such a set can either be pre-recorded, or collected "live" as the network operates). A cost function is then provided, including indications of desired performance of the VAPS or VPMS, and desired trends in parameters, e.g. which parameters can be altered, and by how much. An automated search is then conducted to find the optimum set of parameters and parameter values given the set of data on network traffic. The automated search algorithm can take a number of forms, and may use techniques such as hill climbing, or simulated annealing, or it may be an evolutionary algorithm.

All of the features disclosed in this specification (including any accompanying claims, abstract and drawings), and/or all of the steps of any method or process so disclosed, can be combined in any combination, except combinations where at least some of such features and/or steps are mutually exclusive.

Each feature disclosed in this specification (including any accompanying claims, abstract and drawings) can be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of operating a host within a network of a plurality of hosts, comprising the steps of: monitoring requests to send data to other hosts in the network during successive intervals of time; and for each interval of time, creating (a) a dispatch record for requests which have occurred within the scope of a policy, and (b) a buffer record for requests which have occurred outside the scope of the policy.

2. A method according to claim 1 wherein the dispatch record includes data entries identifying destination hosts to which data has been sent, and a maximum number of entries the dispatch record can contain is defined by the policy.

3. A method according to claim 2 further including periodically-updating the dispatch record to indicate identities of destination hosts to which data has most recently been sent in accordance with the policy.

4. A method according to claim 3 wherein periodic updating of the dispatch record occurs at pretermined time intervals.

5. A method according to claim 4 wherein in each of the time intervals the policy permits data to be sent to a predetermined number of destination hosts which are not identified in the dispatch record.

6. A method according to claim 5 wherein after updating, the dispatch record identifies a predetermined number of destination hosts to which data has most recently been sent in accordance with the policy.

7. A method according to claim 6 wherein updating the dispatch record includes the step of deleting an entry identifying a destination host from the dispatch record and replacing the deleted entry with an entry identifying a destination host to whom data has more recently been sent.

8. A method according to claim 1 wherein the buffer record includes a plurality of entries each identifying a request to send data to destination hosts which are not identified in the dispatch record, each entry in the buffer record identifying the destination hosts in respect of which the request was made.

9. A method according to claim 8 further including periodically updating the buffer record at predetermined time intervals.

10. A method according to claim 9 further comprising the steps of: upon receipt of a request to send data to a destination host, comparing the destination host's identity with destination hosts identified in the dispatch record; and if the dispatch record does not identify the destination host, adding an entry to the buffer identifying the aforesaid request.

11. A method according to claim 10 further comprising the step of removing a number of entries from the buffer record in accordance with the policy at the end of a time interval, the buffer record thereby providing, following the removal step, a record of requests to send data which are outside the scope of the policy.

12. A method according to claim 11 wherein the policy specifies removal of a predetermined number of entries on a first in, first out basis.

13. A method according to claim 11 further comprising the step of determining whether the aforesaid number is above or below a threshold defining viral infection by monitoring the number of entries identified in the buffer record.

14. A method according to claim 11 further comprising the step of generating a signal in response to an indication that the rate of increase of the buffer record exceeds a threshold value.

15. A method according to claim 8 further comprising the step of inhibiting transmission of any request for which an entry exists in the buffer.

16. A method according to claim 15 further comprising the step of transmitting requests upon removal of their entry in the buffer record at the end of a time interval and in accordance with the policy.

17. A method according to claim 7 further comprising the step of transmitting all requests in the buffer.

18. A method according to claim 8 wherein each entry in the buffer record is a copy of a socket relating to a request in respect of which an entry in the buffer record was made.

19. A method according to claim 1 wherein all time intervals are the same length.

20. A method according to claim 1, further comprising:

when one or more requests in the buffer record have fallen within the scope of the policy in a subsequent interval of time, sending data to the respective destination host in accordance with said one or more requests, entering said one or more requests to the dispatch record, and removing said one or more request from the buffer record.

* * * * *